(12) United States Patent
Awai et al.

(10) Patent No.: US 7,382,506 B2
(45) Date of Patent: Jun. 3, 2008

(54) IMAGE READING AND RECORDING APPARATUS

(75) Inventors: Takashi Awai, Tokyo (JP); Akio Okubo, Tokyo (JP); Hideyuki Terashima, Chiba (JP); Yoshiaki Suzuki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 993 days.

(21) Appl. No.: 10/728,825

(22) Filed: Dec. 8, 2003

(65) Prior Publication Data

US 2004/0119996 A1 Jun. 24, 2004

(30) Foreign Application Priority Data

Dec. 24, 2002 (JP) ............... 2002-371628
Dec. 25, 2002 (JP) ............... 2002-375555

(51) Int. Cl.
*H04N 1/04* (2006.01)
*H04N 1/23* (2006.01)

(52) U.S. Cl. ............... 358/498; 358/496; 358/296; 399/363; 399/367

(58) Field of Classification Search ............... 358/498, 358/496, 296, 400; 399/367, 361, 365, 381, 399/110, 1
See application file for complete search history.

(56) References Cited

U.S. PATENT DOCUMENTS

| | | | | |
|---|---|---|---|---|
| 4,969,048 | A * | 11/1990 | Hoshino | 358/296 |
| 5,391,009 | A | 2/1995 | Stodder | 400/605 |
| 5,552,902 | A * | 9/1996 | Kohno | 358/498 |
| 5,884,117 | A * | 3/1999 | Tanoue et al. | 399/1 |
| 5,903,365 | A | 5/1999 | Iwata et al. | 358/498 |
| 5,966,158 | A | 10/1999 | Ebata et al. | 347/104 |
| 6,115,564 | A * | 9/2000 | Morimoto | 399/92 |
| 6,178,017 | B1 * | 1/2001 | Ishida | 358/498 |

(Continued)

FOREIGN PATENT DOCUMENTS

EP 0 473 167 3/1992

(Continued)

*Primary Examiner*—Cheukfan Lee
(74) *Attorney, Agent, or Firm*—Fitzpatrick, Cella, Harper & Scinto

(57) ABSTRACT

An image reading and recording apparatus provided with an image reading portion for reading the image of a document, and an image recording portion for recording an image on a recording sheet is provided with a first stacking portion for stacking thereon a first sheet which is one of the document and the recording sheet, a first feeding device for feeding the first sheet stacked on the first stacking portion, a second stacking portion for stacking thereon a second sheet which is the other of the document and the recording sheet, a second feeding device having a cut-away portion formed by cutting away a portion of the peripheral surface thereof and for feeding the second sheet stacked on the second stacking portion, and a lower guide member extending from the first stacking portion to the second feeding device for guiding the first sheet fed by the first feeding device, and when the first sheet is to be fed by the first feeding device, the second feeding device is stopped in a state in which the cut-away portion is opposed to the lower guide member so as to form between the cut-away portion and the lower guide member a gap through which the first sheet fed by the first feeding device passes.

12 Claims, 15 Drawing Sheets

U.S. PATENT DOCUMENTS

| | | | |
|---|---|---|---|
| 6,181,894 B1 | 1/2001 | Kaneko et al. | 399/82 |
| 7,151,622 B2 * | 12/2006 | Suzuki et al. | 358/498 |
| 2002/0051665 A1 | 5/2002 | Seto et al. | 399/388 |

FOREIGN PATENT DOCUMENTS

| | | |
|---|---|---|
| EP | 0 839 664 A | 5/1998 |
| JP | 61-116645 | 7/1986 |

\* cited by examiner

IMAGE READING AND RECORDING APPARATUS

BACKGROUND OF THE INVENTION

1. Field of the Invention

The invention relates to an image reading and recording apparatus integrally provided with an image reading portion for reading the image of a document, and an image recording portion for recording an image on a sheet, and particularly to an image reading and recording apparatus in which a portion of a document transporting path for transporting the document to the image reading portion and a portion of a sheet transporting path for transporting the sheet to the image recording portion are made into a common transporting path.

2. Description of the Related Art

There has heretofore been an image reading and recording apparatus integrally provided with an image reading portion for reading the image of a document and an image recording portion for recording (forming) an image on a sheet which is a recording medium (for example, described in U.S. Pat. No. 5,391,009).

Such an image reading and recording apparatus, as shown, for example, in FIG. 15 of the accompanying drawings, is provided with a scanning station 122 which is an image reading portion for reading the image of a document, a printing station 124 which is a recording portion for recording an image on a sheet, an automatic sheet feeder (ASF) 126 for transporting the sheet to the printing station 124, and an automatic document feeder (ADF) 128 for transporting the document to the scanning station 122.

Also, in this image reading and recording apparatus, a portion of a sheet transporting path and a portion of a document transporting path are made common to each other, and a pickup roller 132 provided on the lower ends of the feeders 126 and 128 is made available for common use. Design is made such that documents stacked on the ADF 128 and sheets stacked on the ASF 126 are picked up by this pickup roller 132 for common use, whereby the downsizing of the apparatus and a reduction in cost are achieved.

Now, in such a conventional image reading and recording apparatus, the ADF 128 is disposed on the ASF 126 in order to make the pickup by the pickup roller 132 good, and make access simpler for the accurate and appropriate loading between two adjustable guides (not shown).

If the ADF 128 is thus disposed on the ASF 126, even if the sheets are set on the ASF 126, when the documents are set on the ADF 128, the documents are picked up always earlier than the sheets. Therefore, when the copying of a plurality of documents set on the ADF 128 is to be effected, the documents are first successively transported to the scanning station 122, whereafter the sheets are transported to the printing station 124.

However, when design is thus made such that the documents are first successively transported to the scanning station 122, whereafter the sheets are transported to the printing station 124, document image data of all pages must be accumulated in memories and therefore, the number of image memories is increased and along therewith, costs are increased.

Also, in the conventional image reading and recording apparatus, it is more difficult to pick up the documents in the ADF 128 which have bent portions of various sizes than to pick up the sheets in the ASF 126 and therefore, the pickup roller 132 is disposed at the widthwise center of the documents so as to be capable of reliably pick up the documents.

However, when the pickup roller 132 is thus disposed at the widthwise center of the documents, there occurs a case where the position of the pickup roller 132 is not disposed at the widthwise center of the sheets, and in such case, there is the possibility of the skew feeding of the sheets occurring during transport. When the ASF 126 is disposed on the ADF 128, conversely there is the possibility of the skew feeding of the documents occurring.

SUMMARY OF THE INVENTION

The present invention has been made in view of such a situation and an object thereof is to provide an image reading and recording apparatus which does not require many memories and can prevent the skew feeding of a document or a sheet.

Also, an object of the present invention is to provide an image reading and recording apparatus provided with an image reading portion for reading the image of a document, and an image recording portion for recording an image on a recording sheet, the image reading and recording apparatus being provided with:

a first stacking portion for stacking thereon a first sheet which is one of the document and the recording sheet;

first feeding means for feeding the first sheet stacked on the first stacking portion;

a second stacking portion for stacking thereon a second sheet which is the other of the document and the recording sheet;

second feeding means having a cut-away portion formed by cutting away a portion of the peripheral surface thereof and for feeding the second sheet stacked on the second stacking portion; and a lower guide member extending from the first stacking portion to the second feeding means for guiding the first sheet fed by the first feeding means, wherein when the first sheet is to be fed by the first feeding means, the second feeding means is stopped in a state in which the cut-away portion is opposed to the lower guide member so as to form between the cut-away portion and the lower guide member a gap through which the first sheet fed by the first feeding means passes.

DESCRIPTION OF THE PREFERRED EMBODIMENTS

An embodiment of the present invention will hereinafter be described in detail with reference to the drawings.

However, the dimensions, materials, shapes, relative disposition, etc. of constituent parts described in this embodiment, unless particularly specified, are not intended to restrict the scope of the present invention thereto.

Figure 1:
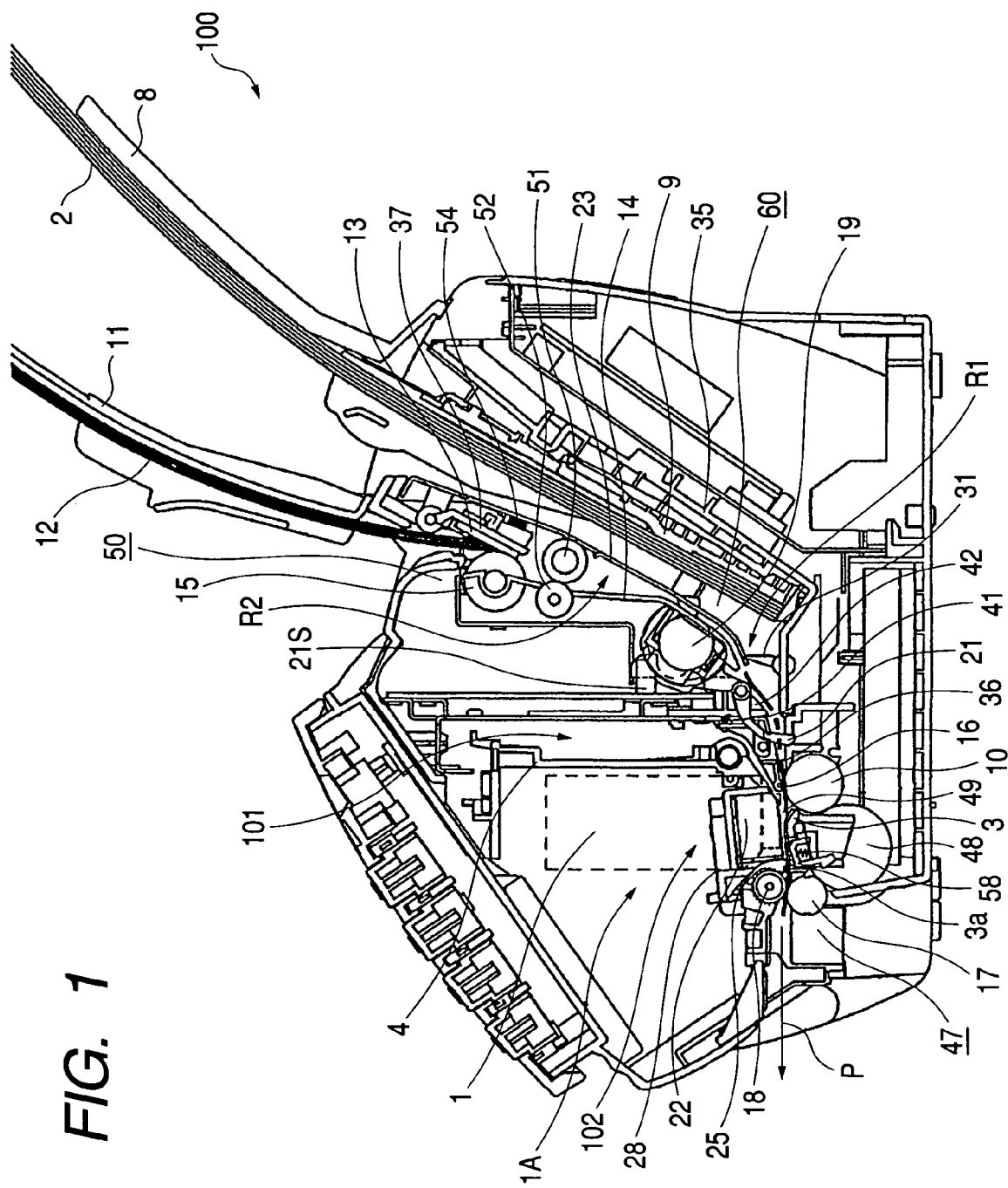
FIG. 1 is a cross-sectional view showing the construction of a facsimile apparatus which is an example of an image reading and recording apparatus according to an embodiment of the present invention.

FIG. 1 is a cross-sectional view showing the construction of a facsimile apparatus which is an example of an image reading and recording apparatus according to the embodiment of the present invention.

In FIG. 1, the reference numeral 100 designates the facsimile apparatus, and the facsimile apparatus 100 is provided with an image recording apparatus portion 101 provided with an image recording portion 1A for recording an image on recording paper 2 which is a recording sheet, an image reading apparatus portion 102 provided with an image reading portion 28 for reading the image of a document 12, a recording paper transporting path R1 along which the recording paper 2 passes, a document transporting path R2 along which the document 12 passes, and a common transporting path 49 provided downstream of the recording paper transporting path R1 and the document transporting path R2 with respect to a transport direction. In this common transporting path 49, there are disposed a transporting roller 10 which is common feeding means for transporting the document 12 and the recording paper 2, and a delivery roller 17 which is common delivery means.

The construction of the image recording apparatus portion 101 will now be described.

Figure 2:
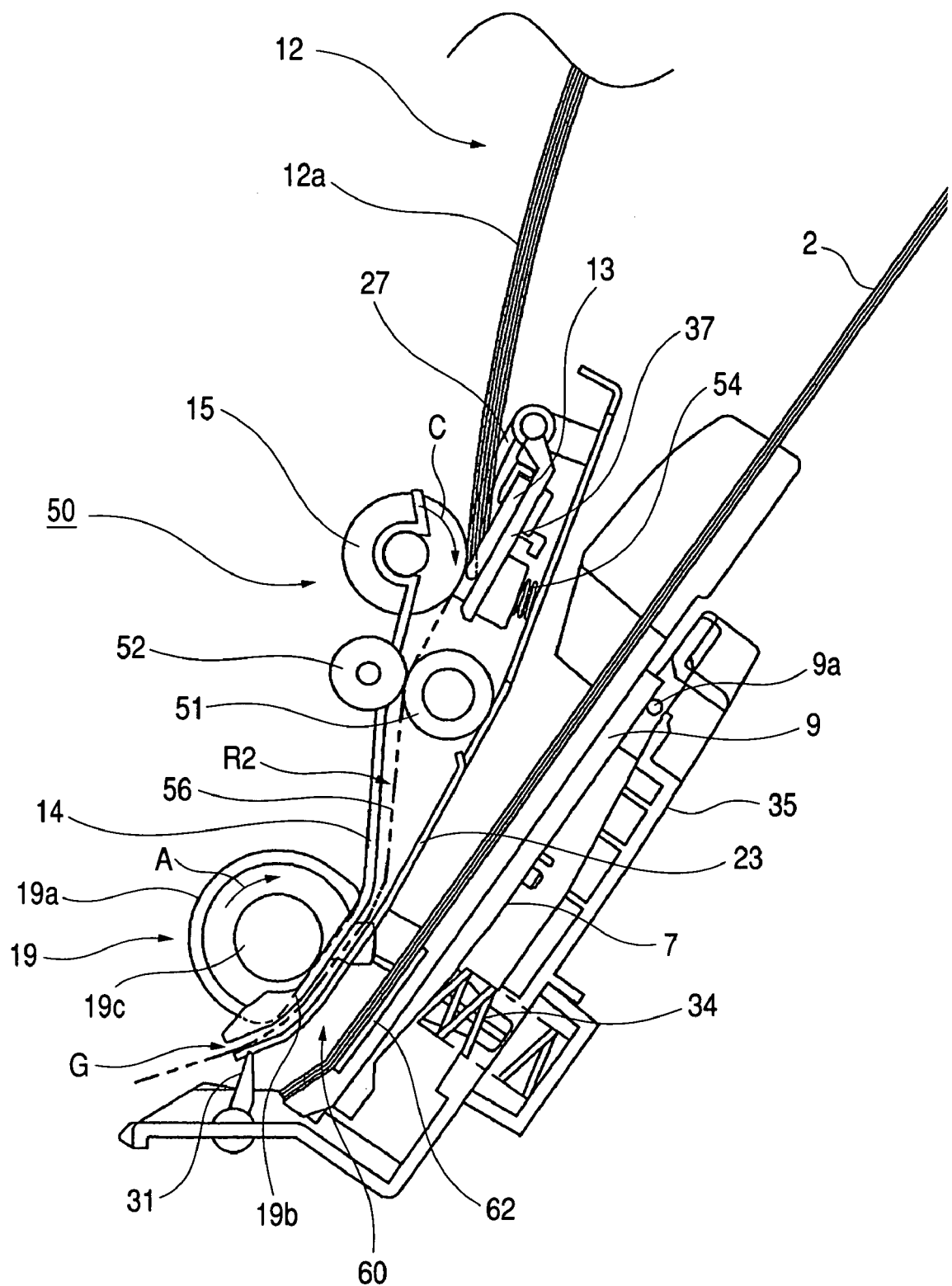
FIG. 2 is a cross-sectional view illustrating the construction of a recording paper and document feeding system in the facsimile apparatus of FIG. 1.

The image recording apparatus portion 101 is provided with the image recording portion 1A which will be described later, and a recording paper feeding portion 60 for feeding the recording paper 2 to the image recording portion 1A. The recording paper feeding portion 60 has a recording paper tray 8 which is a stacking portion capable of stacking and containing thereof a plurality of sheets of recording paper 2, a recording paper separating roller (feeding means) 19 rotated in the direction indicated by the arrow A as shown in FIG. 2, a pressure plate 9 located between the recording paper separating roller 19 and a base member 35 and pivotally supported on the base member 35, a separating pawl 31, etc. The recording paper feeding portion 60 supports the recording paper 2 in its inclined state.

Figure 3:
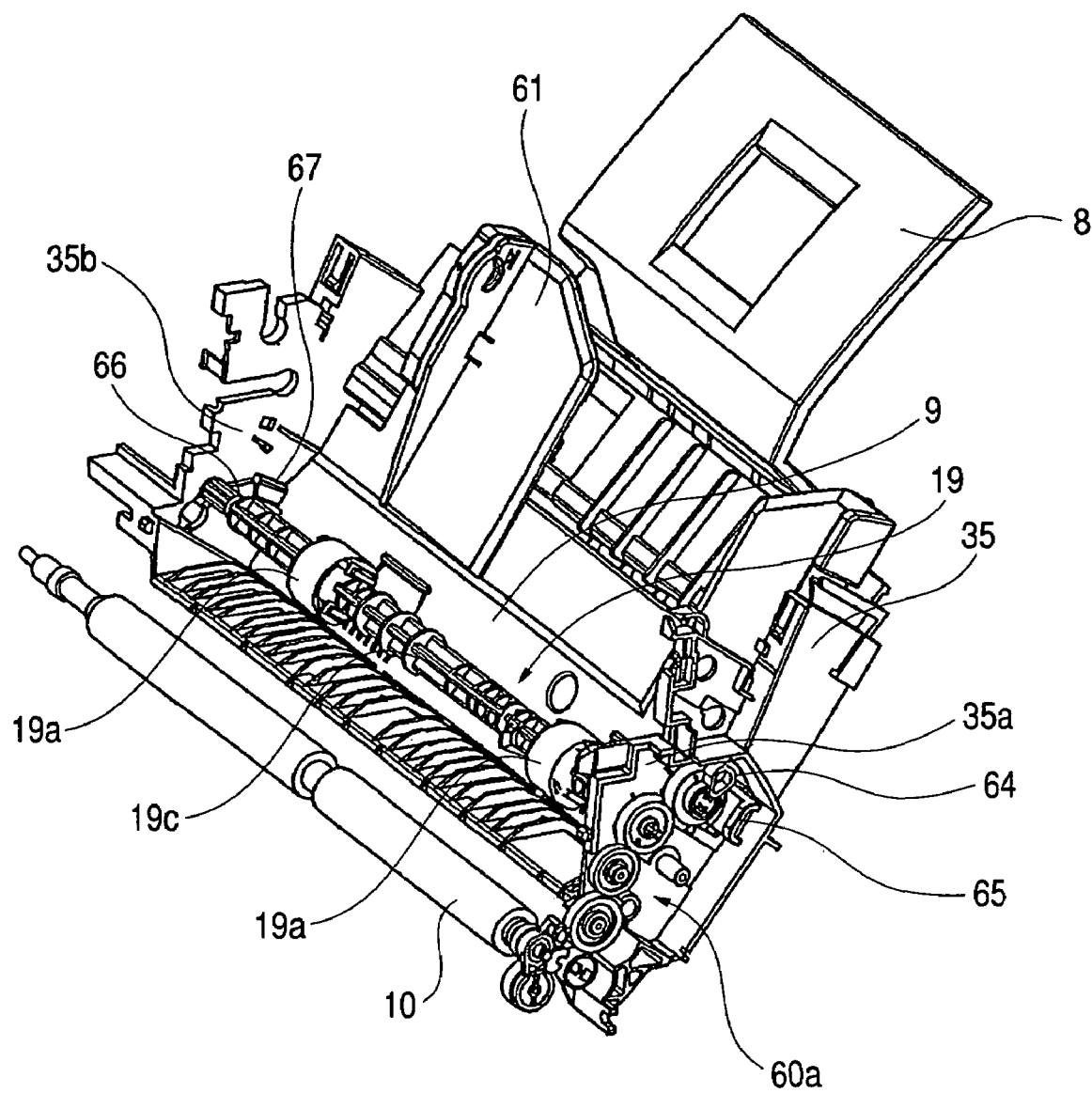
FIG. 3 is a perspective view showing the construction of a recording paper feeding portion in the facsimile apparatus of FIG. 1.

The recording paper separating roller 19 which is second feeding means is an integrally molded article of plastic comprising a shaft portion 19c and two roller portions 19a formed into a larger diameter than the shaft portion 19c, and around the roller portions 19a, there is provided recording paper feeding roller rubber formed of a frictional elastic material for effecting the transport of the recording paper 2. Also, the opposite end portions of the shaft portion 19c, as shown in FIG. 3, is rotatably journalled to the base member 35, and one of them is connected to a drive motor (not shown) via drive transmitting means 60a.

Figure 4:
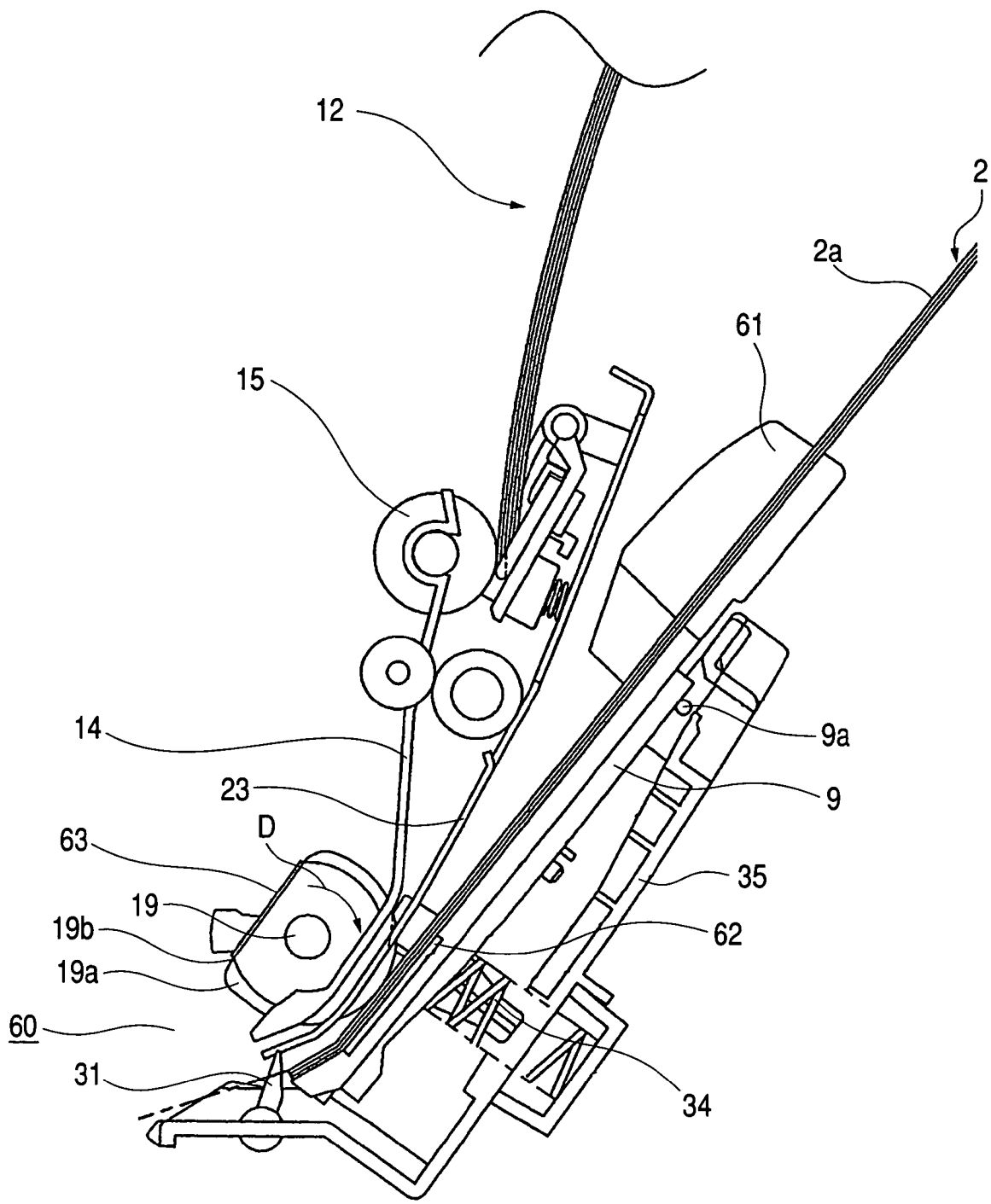
FIG. 4 is a cross-sectional view showing the construction of the recording paper feeding portion in the facsimile apparatus of FIG. 1.
Figure 5:
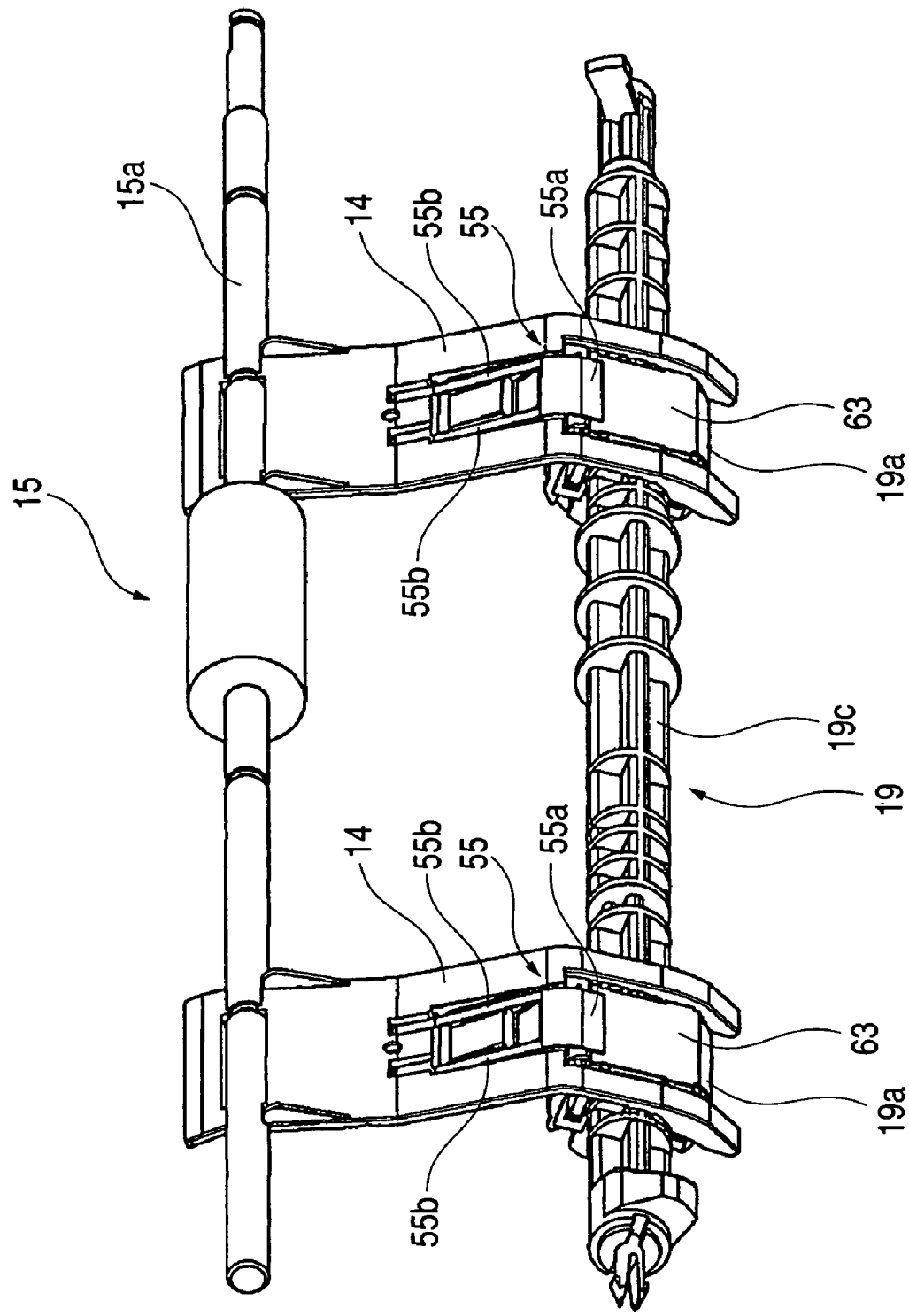
FIG. 5 is a perspective view showing the construction of a recording paper separating roller and a document upper guide in the facsimile apparatus of FIG. 1 as viewed from the rear of the apparatus.

The frictional elastic material having a D-shaped cross section which constitutes the roller portions 19a of the recording paper separating roller 19 has a cut-away portion 19b formed by cutting away a portion of the peripheral surface of the recording paper separating roller 19, as shown in FIG. 4, and on the surface of the cut-away portion 19b, as shown in FIGS. 4 and 5, there is provided a roller guide 63 formed of a thin metal plate or a plastic material having a lower coefficient of friction than the frictional elastic material constituting at least the roller portions 19a so that the aforementioned surface may be low in friction.

As another construction for making the surface of the cut-away portion 19b low in friction, it is also possible to integrally mold the plastic material of the shaft portion 19c of the recording paper separating roller 19 and the frictional elastic material of the roller portions 19a with elastomer to thereby form the surface of the cut-away portion of the roller portion 19a with plastics, thereby providing a low coefficient of friction even if the roller guide 63 is not provided.

The pressure plate 9, as shown in FIG. 2, is pivotally held on the base member 35 through pressure plate shafts 9a provided on the upper portions of the right and left ends, and is biased toward the recording paper separating roller 19 by a pressure plate spring 34. Also, the pressure plate 9 is movable between an initial position which is a second position shown in FIG. 1 for spacing the recording paper 2 apart from the recording paper separating roller 19 with the rotation of the recording paper separating roller 19, by a release cam 64 formed integrally with the recording paper separating roller 19 shown in FIG. 3, and a feeding position which is a first position shown in FIG. 4 for making the recording paper 2 abut against the roller portions 19a of the recording paper separating roller 19, and making the feeding of the recording paper by the recording paper separating roller 19 possible.

The release cam 64 is of such a shape that it depresses the right depressing portion 65 of the pressure plate 9 protruding through a hole (not shown) formed in the right side plate 35a of the base member 35 shown in FIG. 3 only during the time when the cut-away portion 19b of the recording paper separating roller 19 is opposed to the pressure plate 9, and is designed such that the roller portions 19a contact with the recording paper 2 (or with the pressure plate 9 when the recording paper 2 is absent on the pressure plate 9) by the pressure force of the pressure plate spring 34 when any other portion than the cut-away portion 19b of the recording paper separating roller 19 is opposed to the pressure plate 9.

The recording paper separating roller 19 and the release cam 64 are designed to be in phase with each other for each one full revolution, whereby when the recording paper separating roller 19 makes one full revolution by the drive from the drive transmitting means 60*a*, the release cam 64 moves up the pressure plate 9 from the initial position to the feeding position, and thereafter is sequentially moved to a position for moving down the pressure plate from the feeding position to the initial position.

Also, on that side of the shaft portion 19*c* of the recording paper separating roller 19 which is adjacent to the left side plate 35*b* of the base member 35, an auxiliary cam 66 is provided so as to be in phase with the release cam 64, and design is made such that when the pressure plate 9 is depressed by the release cam 64, this auxiliary cam 66 depresses the left depressing portion 67 of the pressure plate 9 which is near the left side plate 35*b* of the base member 35.

By the pressure plate 9 being thus depressed by the two cams 64 and 66, the pressure plate 9 is not inclined with respect to the base member 35 with the rotation of the recording paper separating roller 19 in the direction indicated by the arrow D indicated in FIG. 4, and comes into proximity to (contact with) and becomes spaced apart from the two roller portions 19*a* of the recording paper separating roller 19 substantially in parallel thereto. Thereby, the recording paper 2 can be fed reliably.

At a position whereat the pressure plate 9 faces the recording paper separating roller 19, there is provided a recording paper separating pad 62 formed of a material having a relatively great coefficient of friction such as artificial leather, and by such a recording paper separating pad 62 being provided, the double feeding of the recording paper 2 can be prevented even when the number of sheets of recording paper 2 has become small.

Also, a side guide 61 slidable on the pressure plate 9 in the left to right direction (the widthwise direction orthogonal to the transport direction of the recording paper 2) is mounted on the pressure plate 9, and the side guide 61 is slidden in conformity with the size of the recording paper 2, whereby the recording paper 2 of a different size can be set on a reference surface of one side reference, in the present embodiment, the right side 35*a* of the base member 35 (see FIG. 3).

The separating pawl 31 serves to check the recording paper 2 stacked on a recording paper tray 8 shown in FIG. 2. When the recording paper separating roller 19 is rotated, the uppermost recording paper 2*a* which is in contact with the recording paper separating roller 19 is adapted to be transported over the separating pawl 31 by the friction thereof with the recording paper separating roller 19.

Now, in the present embodiment, the recording paper separating roller 19, when in its standby state, is stopped so that as shown in FIG. 2, the cut-away portion 19*b* formed by cutting away a portion of the peripheral surface of the roller portions 19*a* may be opposed to the recording paper 2 substantially in parallelism to the recording paper, and by being stopped in such a state, not only it does not touch the recording paper 2, but also can form a gap G for passing the document 12 therethrough between it and a document lower guide member 23 for guiding the document 12 to the common transporting path 49 as will be described later.

Figure 6:
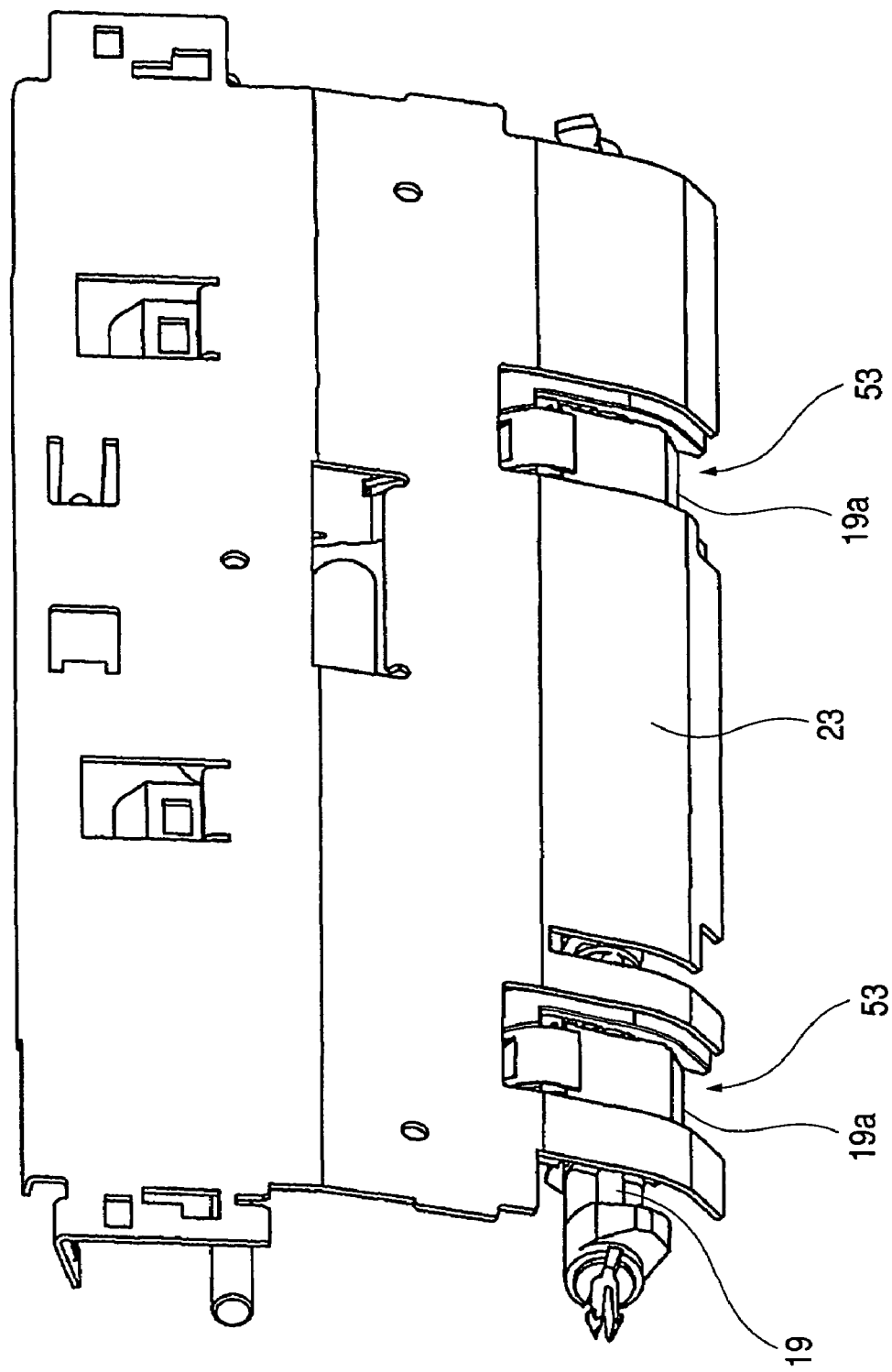
FIG. 6 is a perspective view showing the construction of the recording paper separating roller and a document lower guide member in the facsimile apparatus of FIG. 1 as viewed from the rear of the apparatus.

When the recording paper 2 is to be transported, the recording paper separating roller 19 is designed such that it is rotated and a portion of the peripheral surface of the roller portions 19*a* protrudes downwardly of the document lower guide member 23, as shown in FIG. 4, beyond a cut-away 53 shown in FIG. 6 which is formed in the document lower guide member 23, and abuts against the uppermost recording paper 2*a* of a bundle of recording paper stacked on the pressure plate 9.

Further, the recording paper separating roller 19 makes one full revolution, whereafter the cut-away portion 19*b* shown in FIG. 2 is again opposed to the recording paper 2 and the recording paper separating roller 19 is returned to its standby state in which the pressure plate 9 is depressed by the release cam 64. Thus, when a transporting roller 10 is transporting the uppermost recording paper 2*a*, the second and subsequent recording paper 2 does not contact with the recording paper separating roller 19, and it becomes possible to effect the stable transport of the recording paper 2.

Downstream of the recording paper separating roller 19, as shown in FIG. 1, there is provided a paper edge sensor (PES) lever 21 for detecting the transport of the recording paper 2 (or the document 12), and if a paper edge sensor (PES) 21S does not detect the passage of the recording paper 2 (or the document 12) through the PES lever 21 even when a paper feeding operation is started, a re-feeding operation is performed, and if the PES 21S does not yet detect the passage of the recording paper 2 (or the document 12), the transporting operation is error-stopped and an error is adapted to be displayed on an operation panel (not shown) or the like.

Figure 7:
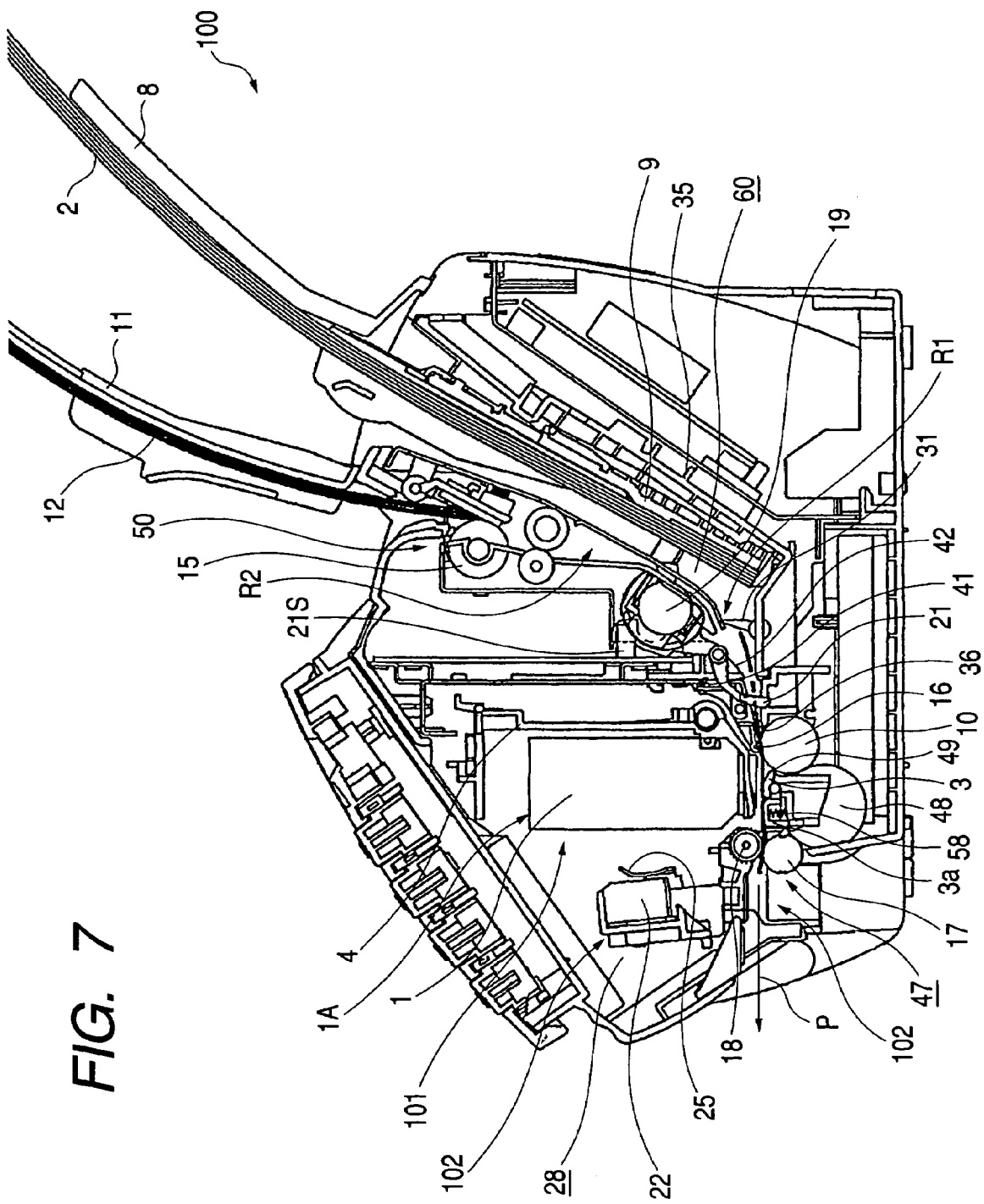
FIG. 7 is a cross-sectional view showing the general construction of the facsimile apparatus of FIG. 1 during the recording operation thereof.
Figure 9:
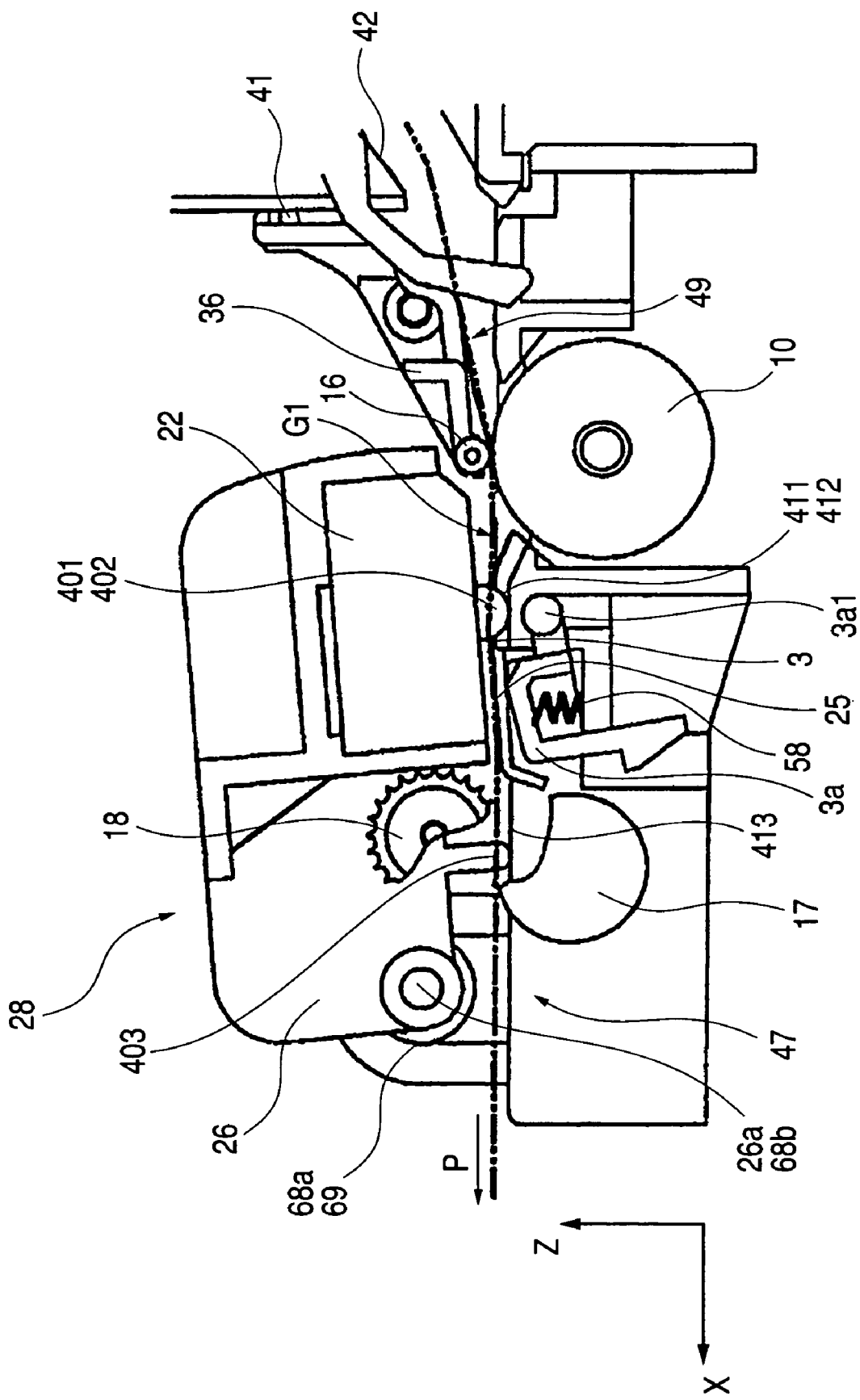
FIG. 9 shows a transport route for the document passing through a reading portion in the facsimile apparatus of FIG. 1.

On the other hand, the common transporting path 49 provided downstream of a recording transporting path R1 along which the recording paper 2 fed out by the recording paper separating roller 19 passes with respect to the transport direction is provided with a platen 3 functioning as a supporting surface for transporting the recording paper 2, and an auxiliary platen member 3*a* provided downstream of the platen 3 and functioning as a supporting surface for the underside of the recording paper 2 in subsequence to the platen 3, as shown in FIGS. 7 and 9.

Figure 8:
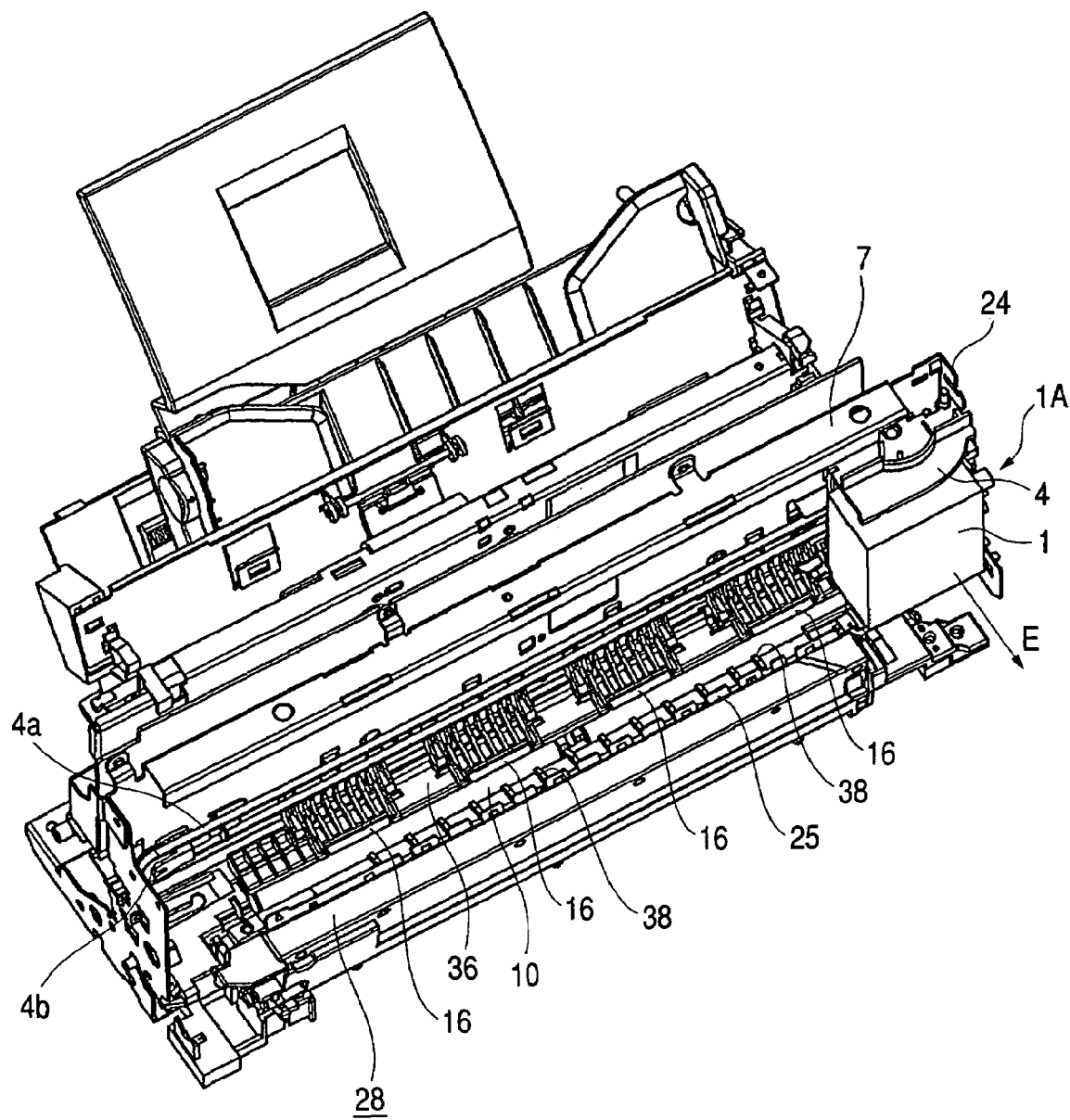
FIG. 8 is a perspective view showing the ink cartridge interchange of a recording portion in the facsimile apparatus of FIG. 1.

A plurality of ribs 38 are formed on the recording paper supporting surface of the platen 3 in the widthwise direction of the recording paper, as shown in FIG. 8, and during the transport of the recording paper, the recording paper 2 passes on the upper surfaces of these ribs 38.

Also, the auxiliary platen member 3*a* which constitutes a supporting portion for supporting the recording paper 2 together with the platen 3 which is a supporting member is disposed in a recess formed in the recording paper supporting surface of the platen 3, and is held for pivotal movement in a vertical direction by the platen 3 through a shaft 3*a*1 shown in FIG. 9 which is formed upstream of the opposite sides with respect to the transport direction of the recording paper, and is normally resiliently biased, for example, by a spring 58, and is held at a position whereat the upper recording paper supporting surface thereof is flush with the recording paper supporting surface constituted by the upper surface of the platen 3.

The auxiliary platen member 3*a* is designed to be pivotally moved in a direction to sink by the order of 5 mm relative to the recording paper supporting surface of the platen 3 when as will be described later, it is pushed from above it by a CS holder 26 beyond the biasing force of the spring 58.

Further, the common transporting path 49, as shown in FIGS. 1, 8 and 9, is provided with four pinch rollers 16 juxtaposed in the widthwise direction of the recording paper and being in contact with the transporting roller 10, an upper guide 42 and a delivery portion 47, in addition to the transporting roller 10 journalled to the platen 3. The transporting roller 10 produces a transporting force for transporting the recording paper 2 or the document 12 by the pinch rollers 16 biased by a pinch roller spring 41 through a pinch roller guide 36.

The transport direction of the recording paper 2 by the transporting roller 10 and the pinch rollers 16 is set so as to be an obliquely downward direction from the upstream side toward the downstream side of the roller, and the transport direction of the recording paper 2 by a delivery roller 17 and spurs 18 is set so as to be an obliquely upward direction from the upstream side toward the downstream side of the roller. Thus, in the common transporting path 49, the recording paper 2 is transported in a direction P while contacting with the upper surfaces of the platen 3 and the auxiliary platen member 3a.

The recording paper transporting force F produced by the transporting roller 10 and the pinch rollers 16 is such a magnitude that the frictional resistance force between the back of the document lower guide member 23 shown in FIG. 2 and the recording paper 2 can be neglected, but when it affects the feeding accuracy of the recording paper, a low friction member such as a high molecular sheet may be stuck on the back of the document lower guide member 23.

Also, the delivery portion 47 is provided with the delivery roller 17 formed by integrally molding plastics and elastomer, a transmitting roller 48 (see FIG. 1) for transmitting the drive of the transporting roller 10 to the delivery roller 17, and the plurality of spurs 18 for assisting delivery. The spurs 18 are urged against the delivery roller 17 by a spur spring (not shown), and the recording paper 2 or the document 12 is delivered out of the apparatus by the delivery roller 17 and the spurs 18.

As regards the number of the spurs 18 and the biasing force (spur pressure) thereof against the delivery roller 17, a proper number and proper spur pressure are prescribed so as not to stain the unfixed ink of a recorded image by the spurs 18, and in the present embodiment, thirteen spurs 18 are arranged in the widthwise direction of the recording paper 2.

These are driven by a drive motor and therefore, it is unnecessary to discretely provide a drive motor for reading and a document transporting mechanism, and a reduction in costs is realized and the downsizing of the entire apparatus is obtained.

Also, in FIGS. 1 and 8, the reference numeral 1 designates an ink cartridge which is image recording means, and the image recording portion 1A for recording an ink image on the recording material transported by the transporting roller 10 or the delivery roller 17 is of an ink jet recording type which discharges ink from the ink cartridge 1 to thereby effect recording. The ink cartridge 1 is provided with a minute liquid discharge port (orifice), a liquid path, an energy acting portion provided in a portion of this liquid path, and energy generating means for generating liquid droplet forming energy acting on the liquid in the acting portion.

The reference numeral 4 denotes a carriage carrying the ink cartridge 1 thereon and scanning in a widthwise direction orthogonal to the transport direction of the recording paper 2, and an endless timing belt 4a passed over a driving pulley (not shown) and a driven pulley 4b is connected to the carriage 4, and by the driving pulley being rotatively driven, the carriage 4 can be reciprocally moved along a guide rail 7 provided on the upper portion of a chassis 24. When the carriage 4 is thus reciprocally moved, ink is discharged from the ink cartridge 1 in conformity with image information, whereby an image is recorded on the recording paper 2.

Figure 10:
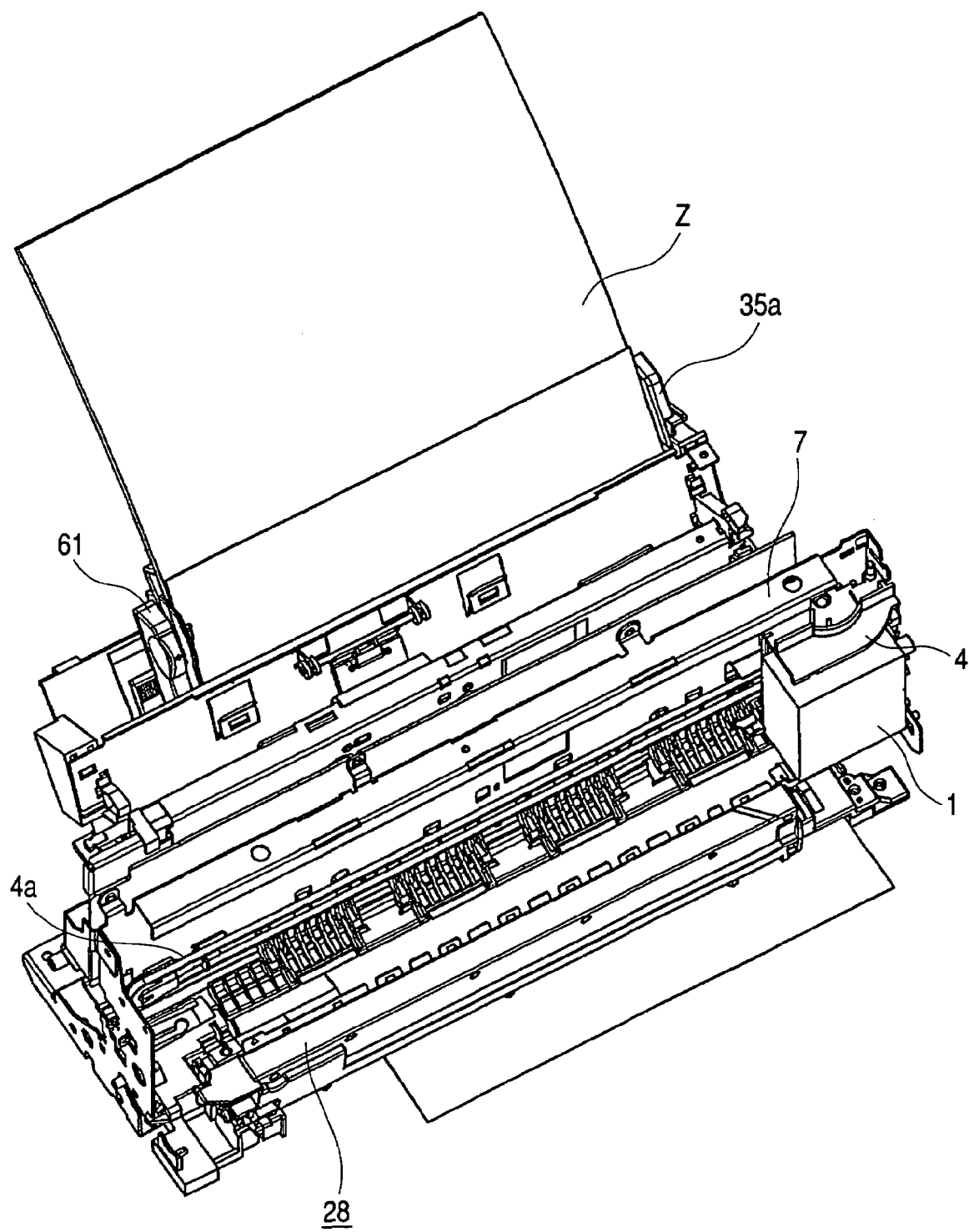
FIG. 10 is a perspective view showing the arrangement and construction of the recording portion and the reading portion in the facsimile apparatus of FIG. 1 during the recording operation thereof.

Now, the carriage 4 normally stands by at a standby position at one end (right end) of the guide rail 7 shown in FIGS. 8 and 10, and the printing head (not shown) of the ink cartridge 1 is protected by a rubber member (not shown) so as not to dry when the carriage 4 is at such a standby position. Also during a document image reading operation which will be described later, the carriage 4 stays at the standby position.

Further, design is made such that when the ink in the ink cartridge 1 has become exhausted, the ink cartridge 1 removed in the direction indicated by the arrow E in FIG. 8 at a position shown in FIG. 8 to thereby effect the interchange thereof. By designing such that the ink cartridge 1 is interchanged at such a standby position, it is possible to interchange the ink cartridge 1 without a reading portion 28 which will be described later becoming a hindrance.

Description will now be made of the image recording operation of the thus constructed image recording apparatus portion 101.

When an image signal is inputted from an external device (not shown) with the recording paper 2 set on the recording paper tray 8, the transporting roller 10 is first driven and the drive thereof is transmitted to the recording paper separating roller 19 and the release cam 64, whereupon as shown in FIG. 1, the recording paper separating roller 19 and the release cam 64 are rotated.

Thereby, the pressure plate 9 is moved up to a position shown in FIG. 4 and the recording paper separating roller 19 comes into contact with the recording paper 2 and as the result, the recording paper 2 is picked up with the rotation of the recording paper separating roller 19 in the direction indicated by the arrow D, and is transported toward the common transporting path 49.

At this time, the recording paper 2 transported by the recording paper separating roller 19 is checked by the separating pawl 31, but only the uppermost recording paper 2a set by the friction thereof with the roller portions 19a of the recording paper separating roller 19 is transported over the separating pawl 31 and toward the common transporting path 49. Also, the recording paper separating roller 19 and the release cam 64 make one full revolution until they feed the recording paper 2 into the common transporting path 49, and the drive from the transporting roller 10 is cut off with the pressure plate 9 being again released relative to the recording paper separating roller 19, and this initial state is kept.

Next, the recording paper 2 transported toward the common transporting path 49 is guided by the platen 3, the pinch roller guide 36 and the upper guide 42, and is transported to the nip between the transporting roller 10 and the pinch rollers 16 while depressing the PES lever 21. Here, design is made such that when the PES lever 21 is thus depressed, a detection signal is inputted from the PES 21S to control means (not shown), which in turn detects the leading edge of the recording paper 2 on the basis of the detection signal to thereby find a printing position on the recording paper 2.

Next, the recording paper 2 transported by the transporting roller 10 and the pinch rollers 16 is nipped by the transporting roller 10 and the four pinch rollers 16, and passes on the recording paper supporting surface which is the upper surface of the supporting portion constituted by the platen 3 and the auxiliary platen member 3a.

When the recording paper 2a thus passes on the recording paper supporting surface, in the image recording portion 1A, the ink is discharged from the ink cartridge 1 carried on the carriage 4 scanned (reciprocally moved) in the widthwise direction of the recording paper 2a in conformity with image information, whereby an image is recorded on the recording paper. Thereafter, after the image has been recorded, the recording paper 2a is delivered out of the apparatus as indicated by the arrow P, by the delivery roller 17.

In the present embodiment, the printing operation on the recording paper 2 is done with one side portion (right side portion) 35a of the base member 35 in FIG. 3 as the recording reference as already described. Also, the two roller portions 19a of the recording paper separating roller 19 are disposed, for example, at locations spaced apart by about 40 mm and about 180 mm from one side portion 35a. By disposing the two roller portions 19a as described above, it is possible to cope with recording paper 2 of various sizes of a postcard to A4.

The image reading apparatus portion 102 will now be described.

The image reading apparatus portion 102 is provided with an image reading portion 28 which will be described later, and a document feeding portion 50 for feeding the document to the image reading portion 28. The document feeding portion 50, as shown in FIG. 1, has a document tray 11 which is a stacking portion capable of containing a plurality of documents 12 therein, a document separating roller (feeding means) 15 for feeding out the documents set on the document tray 11, a document feeding roller 51, a document feeding runner 52, a document upper guide 14, etc. The document tray 11 of the document feeding portion 50 is disposed in juxtaposed relationship with the recording paper tray 8 of the recording paper feeding portion 60.

Also, the recording paper separating roller 19 is disposed downstream of the document separating roller 15 with respect to the document transport direction by the document separating roller 15.

Figure 11:
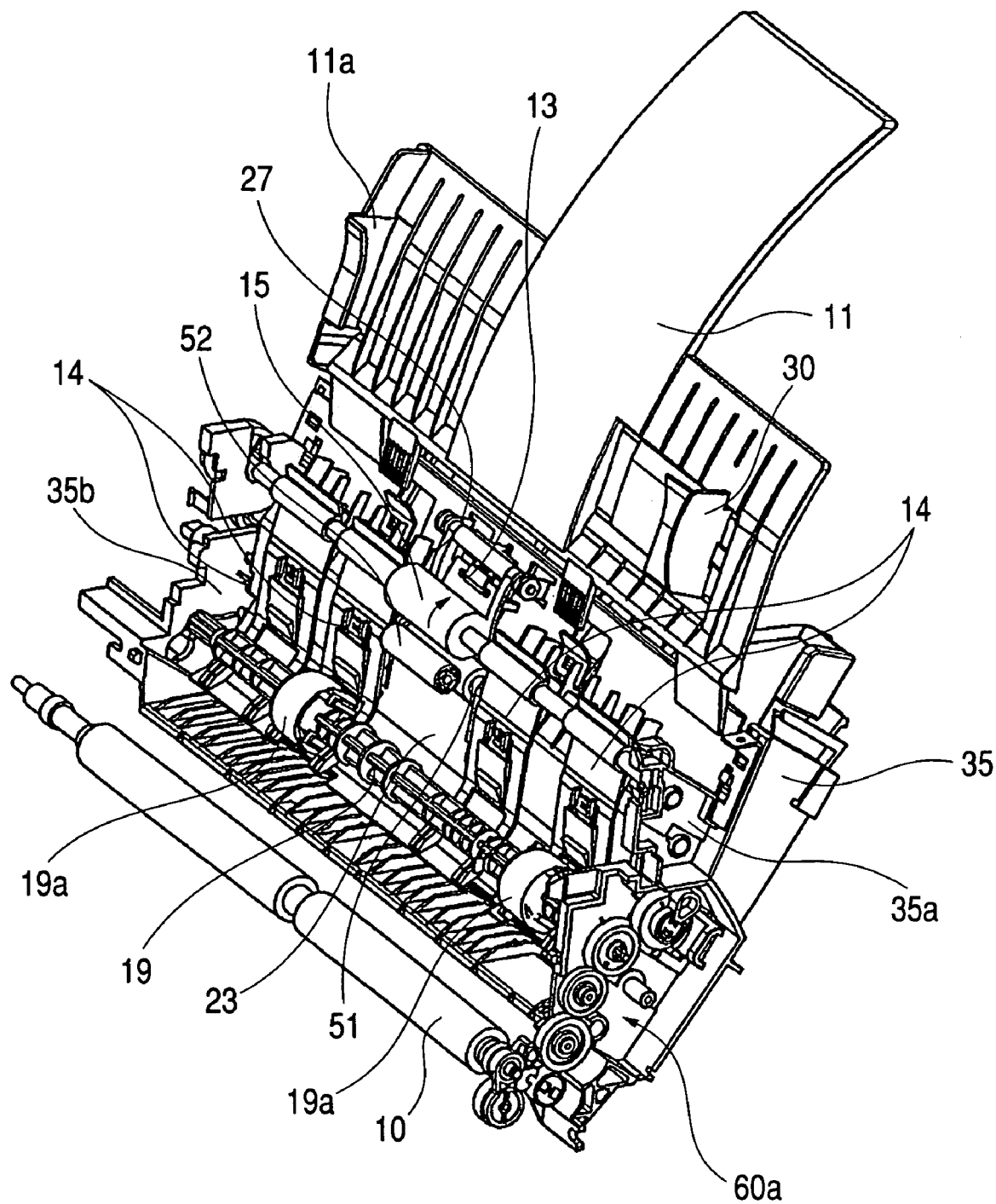
FIG. 11 is a perspective view showing the construction of a document feeding portion in the facsimile apparatus of FIG. 1.

The document feeding portion 50 has one side of the document 12 as the reference, and in the present embodiment, as shown in FIG. 11, the inner wall of the left side plate 11a of the document tray 11 is the document reference. Also, a document slider 30 for preventing skew feeding is provided on the document tray 11, and is movable in accordance with the width of the document 12.

The document separating roller 15 is rotated in the direction indicated by the arrow to thereby transport the documents 12 set on the document tray 11, and is rotatably journalled to the opposite side portions 35a and 35b of the base member 35. Also, one end of the shaft 15a (see FIG. 5) of the document separating roller 15 is connected to a drive motor through reading drive transmitting means and drive changeover means (not shown).

The drive changeover means is adapted to be changed over by control means (not shown), and in the case of an image recording operation, transmit the drive of the drive motor to recording drive transmitting means to thereby drive the recording paper separating roller 19, and in the case of an image reading operation, transmit the drive of the drive motor to the document separating roller 15, the document feeding roller 51 and the image reading portion 28 through the reading drive transmitting means.

In FIG. 2, the reference numeral 13 designates a document separating piece brought into pressure contact with the document separating roller 15 by a separating spring 54, and the document separating piece 13 is formed of a material of a high coefficient of friction such as rubber and is held by a separating piece supporting member 37 rotatably journalled to the document lower guide member 23 for directing the document 12 fed out by the document separating roller 15 to the common transporting path 49. The reference numeral 27 denotes a document transporting auxiliary member for urging the document 12 against the document separating roller 15 by a spring (not shown) to thereby perform the auxiliary operation of document separation.

When the documents 12 are set on the document tray 11, the leading edges of the documents 12 are stopped by a wedge shape formed by the separating piece 13 and the document separating roller 15, and when thereafter the document separating roller 15 is rotated in the direction indicated by the arrow C, only the uppermost document 12a of the documents 12 stopped by the wedge shape is transported by the friction thereof with the document separating roller 15. As shown in FIG. 11, a document slider 30 for preventing the skew feeding of the document 12 is provided on the document tray 11 for movement in accordance with the width of the document.

The document feeding roller 51 is comprised of a cylindrical frictional elastic member mounted on a shaft member formed of a metal, and is rotatably journalled to the side plates 35a and 35b of the base member 35, and one end of the shaft thereof is connected to the reading drive transmitting means. Also, the document feeding runner 52 is biased toward the document feeding roller 51 by a document feeding runner spring (not shown), and produces a document transporting force.

The document upper guide 14 is disposed above the document lower guide member 23 which is a lower guide member and constitutes the upper surface of a document transporting path R2, and this document upper guide 14 which is an upper guide member is formed into a strip shape, and the upper end thereof, as shown in FIG. 2, is pivotally supported on the shaft portion 15a of the document separating roller 15, and hangs down onto the document lower guide 23 from gravity and constitutes the upper surface of the document transporting path R2.

The document upper guide 14 is formed of resin or the like of good slidability and is light in weight, and is pivotally movable about the shaft portion 15a of the document separating roller 15 by a light force and therefore, is adapted to be pushed upwardly about the document separating roller 15 by the stiffness of the document 12 and the fluttering of the leading edge or the trailing edge thereof when the document 12 is being transported between the document upper guide 14 and the document lower guide member 23 by the document feeding roller 51 or the transporting roller 10. By the document upper guide 14 being thus pushed upwardly, the document transporting path R2 is secured.

The feeding speeds of the document feeding roller 51 and the transporting roller 10 are set to the same speeds, but when the transporting roller 10 is faster due to the dimensional tolerance or the like of the diameter of each roller, tension is applied to the document 12 when the document 12 is being transported while being nipped between the document feeding roller 51 and the transporting roller 10. Such tension becomes a force which upwardly pushes the document upper guide 14, whereby the document upper guide 14 is pushed up.

When the document upper guide 14 is thus pushed up by the tension applied to the document 12 being transported, the document upper guide 14 is upwardly displaced and as shown in FIG. 2, the upper surface of the lower portion thereof abuts against the shaft portion 19c of the recording paper separating roller 19, but design is made such that even in a state in which the document upper guide 14 thus abuts against the shaft portion 19c of the recording paper separating roller 19, the guide surface of the document upper guide 14 is located more adjacent to the document transporting path R2 than the cut-away portion 19b of the recording paper separating roller 19.

That is, even if the document 12 is pushed up when it is transported, the document upper guide 14 is positioned (regulated in pivotal movement) at a location whereat the recording paper separating roller 19 does not contact with the document 12, by (the shaft portion 19c of) the recording paper separating roller 19. Thereby, when the document 12 is transported, the recording paper separating roller 19 does not contact with the document 12 and does not hamper the transport of the document 12.

Also, the recording paper separating roller 19 may sometimes be downwardly flexed by gravity because as already described, the shaft portion 19c thereof is formed of a flexible material such as plastics, but even in such a case, the document upper guide 14 abuts against the shaft portion 19c of the recording paper separating roller 19 being flexed and therefore, the relative positional relationship between the recording paper separating roller 19 and the document upper guide 14 is maintained, and it never happens that the cut-away portion 19b of the recording paper separating roller 19 protrudes into the document transporting path R2. Thus, the document 12 does not contact with the recording paper separating roller 19, but is fed reliably and stably.

Further, as already described, the roller guide 63 formed of a low-friction material is mounted on the cut-away portion 19b of the recording paper separating roller 19 and therefore, even when the document 12 contacts with the roller portions 19a of the recording paper separating roller 19, faulty transport can be prevented.

Now, in the present embodiment, as shown in FIG. 11, each two, four in total, document upper guides 14 (14a, 14b, 14c, 14d) are provided on the right and left of the frictional elastic member of the document separating roller 15, and the right and left document upper guides 14b and 14c are disposed at the same locations as the roller portions 19a of the recording paper separating roller 19.

As already described, the two roller portions 19a of the recording paper separating roller 19 are provided at locations of about 40 mm and about 180 mm from the recording paper reference (the inner wall of 35a), and the document reference is the inner wall of the left side plate 11a of the document tray 11.

Accordingly, in the present embodiment, the positions of the recording paper 2 and the document 12 in the widthwise direction thereof orthogonal to the transport direction thereof differ by about 40 mm from each other. Design is made such that when for example, recording paper 2 and a document 12 of A4 size are to be transported, the document 12 is transported along a position deviated by 41.5 mm to the left from the recording paper 2 toward the apparatus.

Also, as shown in FIG. 5, the document upper guide 14 is of a shape in which the widthwise center thereof is cut away from the middle to the lower portion thereof and therefore, it never happens that when the recording paper separating roller 19 is rotated, the roller portions 19a interferes with the document upper guide 14. Further, as shown in FIG. 6, a cut-away portion 53 is provided in that portion of the document lower guide member 23 which extends to the recording paper separating roller 19 and forms the underside of the document transporting path R2 until the document 12 is transported to the common transporting path 49 and in which the roller portions 19a of the recording paper separating roller 19 are disposed.

Accordingly, when as shown in FIG. 4, the recording paper separating roller 19 is rotated to thereby feed the recording paper 2, the roller portions 19a of the recording paper separating roller 19 are rotated beyond the document upper guide 14 and the cut-away portion 53 of the document lower guide member 23 and therefore, without interfering with these, the recording paper 2 can be fed reliably.

Figure 12:
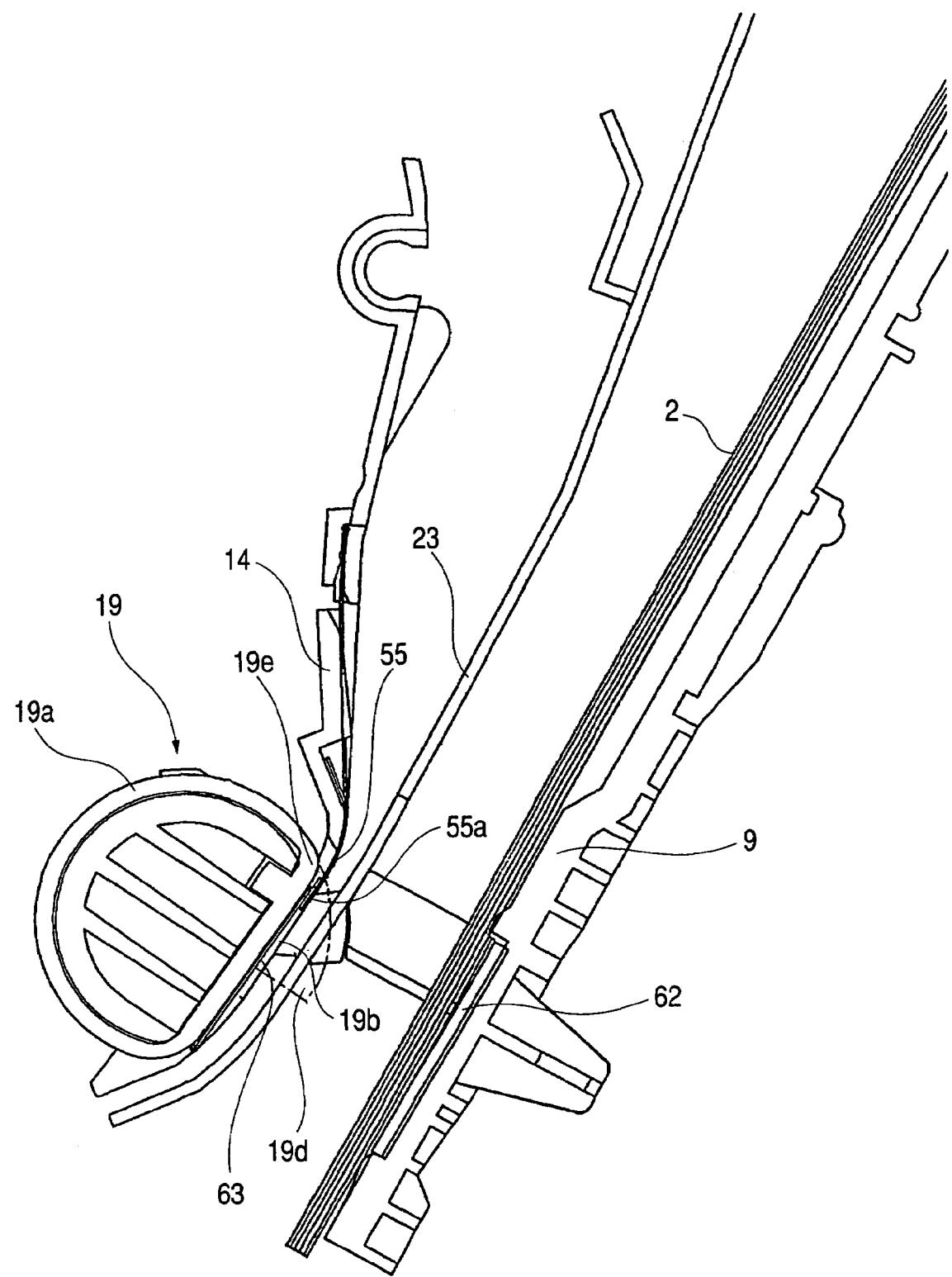
FIG. 12 is a cross-sectional view showing the details of the recording paper feeding portion in the facsimile apparatus of FIG. 1 during document feeding.

Also, as shown in FIG. 5, document presser members 55 having flexibility which are presser means for pressing the document 12 passing between the document upper guides 14 and the document lower guide member 23 are mounted on the cut-away portions of the two document upper guides 14 which are disposed at the locations of the roller portions 19a of the recording paper separating roller 19. The lower end portion 55a of each of these document presser members 55 extends into a crescent-shaped area 19d indicated by dot-and-dash line in FIG. 12 which is formed by the rotation radius of the roller portions 19a and the cut-away portion 19b of the recording paper separating roller 19.

The lower end portion 55a of each of the document presser members 55 extends into such an area 19d, whereby the document transporting path R2 is secured and also, the document presser member 55 can cover the corner 19e of the cut-away portion 19b of the recording paper separating roller 19 and the upper portion of a roller guide 63 mounted on the cut-away portion 19b, whereby the document transporting path R2 is secured, and when the document 12 is transported, the leading edge of the document 12 can be prevented from being caught by the corners 19e of the roller portions 19a or the end portion of the roller guide 63 to thereby cause faulty transport.

Figure 13:
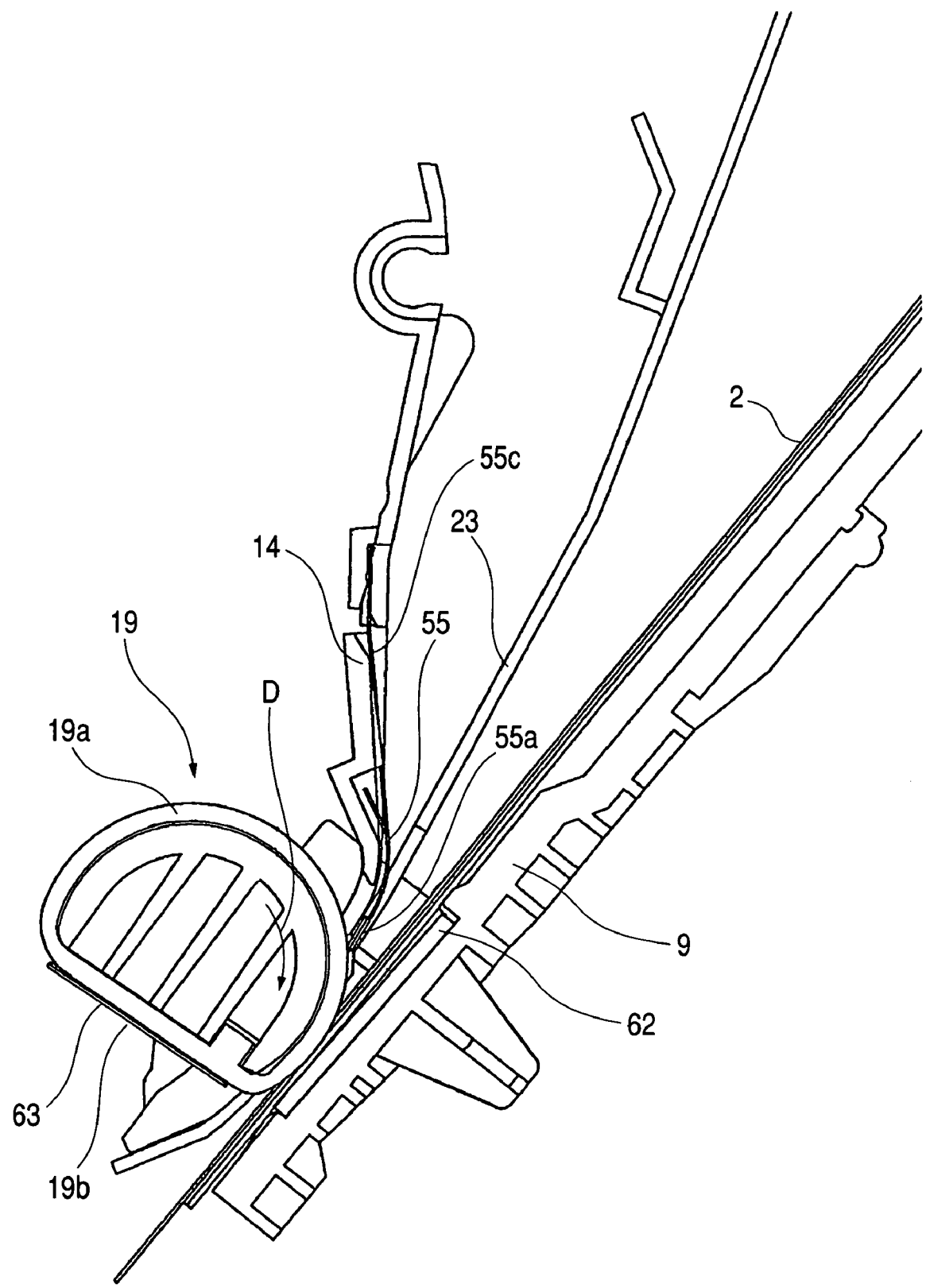
FIG. 13 is a cross-sectional view showing the details of the recording paper feeding portion in the facsimile apparatus of FIG. 1 during recording paper feeding.

When as shown in FIG. 13, the recording paper separating roller 19 is rotated in the direction indicated by the arrow D, the roller portions 19a interfere (contact) with the document presser members 55, but in such a case, the document presser members 55 are flexed and therefore do not hamper the rotation of the recording paper separating roller 19.

Also, as shown in FIG. 5, two thin arm portions 55b are formed on the upper portion of each document presser member 55, and each document presser member 55 is mounted on the document upper guide 14 by thin arm portion 55b.

If design is made such that as described above, the document presser members 55 are mounted on the document upper guide 14 by the arm portions 55b provided on the upper portions thereof, that is, are supported upstream of the recording paper separating roller 19, when in a state in which the recording paper 2 is in contact with the roller portions 19a of the recording paper separating roller 19, the document presser members 55 interfere with the recording paper separating roller 19, a point 55c at which each document presser member 55 is flexed is the upper portion of the document presser member 55, as shown in FIG. 13.

When the document presser members 55 are thus flexed at the upper portions thereof, it never happens that the lower end portions 55a of the flexed document presser members 55 extremely approach the recording paper 2, and the lower end portions 55a move to the upstream of the nip position between the roller portions 19a of the recording paper separating roller 19 and the recording paper 2 and therefore, do not contact with the recording paper 2. Thus, the recording paper 2 is transported without being hampered by the flexed document presser members 55.

The image reading portion 28, as shown in FIGS. 1 and 9, is disposed between the transporting roller 10 and the delivery roller 17 and in the movement route of the carriage 4 so as to be opposed to the platen 3, and is adapted to read the upper surface of the document 12 being transported, and by providing the image reading portion 28 in the movement route of the carriage 4 as described above, it is possible to achieve the downsizing of the facsimile apparatus 100.

The image reading portion 28 is provided with a contact image sensor 22 which is image reading means, a CS holder 26 which is a holding member for holding the contact image sensor (hereinafter referred to as the CS) 22, and a white reference member 25 held in a state opposed to the CS 22 by the CS holder 26.

The CS 22 is contained in a recess formed in the CS holder 26 so that the sensor surface thereof may be outer, and is fixed by a screw (fastening member) (not shown). Also, the white reference member 25 is formed by a white sheet being attached to a metal plate, and the metal plate is provided with a flat surface to which the white sheet is attached, and bent portions formed on the lengthwisely opposite end portions of the metal plate.

Holes are formed in the two bent portions, and a shaft formed on the CS holder 26 is engaged with these holes to thereby support the white reference member 25 for pivotal movement relative to the CS holder 26 and the CS 22. This white reference member 25 is biased toward the CS side by a torsion coil spring (not shown).

Also, the white reference member 25 has, on the outer side thereof in the widthwise direction of the document, a projection (not shown) abutting against the CS 22 while being biased against the CS 22, and design is made such that by the projection, a gap G1 (reading transport path) shown in FIG. 9 through which at least one document can pass is formed between the sensor surface of the CS 22 and the white sheet of the white reference member 25.

Now, the white reference member 25 cooperating with the CS 22 to form the reading transport path can assume a normal position in which it is biased by the torsion coil spring to thereby form the gap G1 through which a document can pass, and a cleaning position in which against the torsion coil spring, the white reference member 25 has been pivotally moved away from the CS 22.

When the white sheet of the white reference member 25 or the reading surface of the CS 22 is contaminated by stains adhering to the front and back sides of the document 12 transported thereto, or rarely by the ink mist of the image recording portion 1A, the white reference member 25 is moved to the cleaning position, whereby a user can simply clean the contaminated portion.

Figure 14:
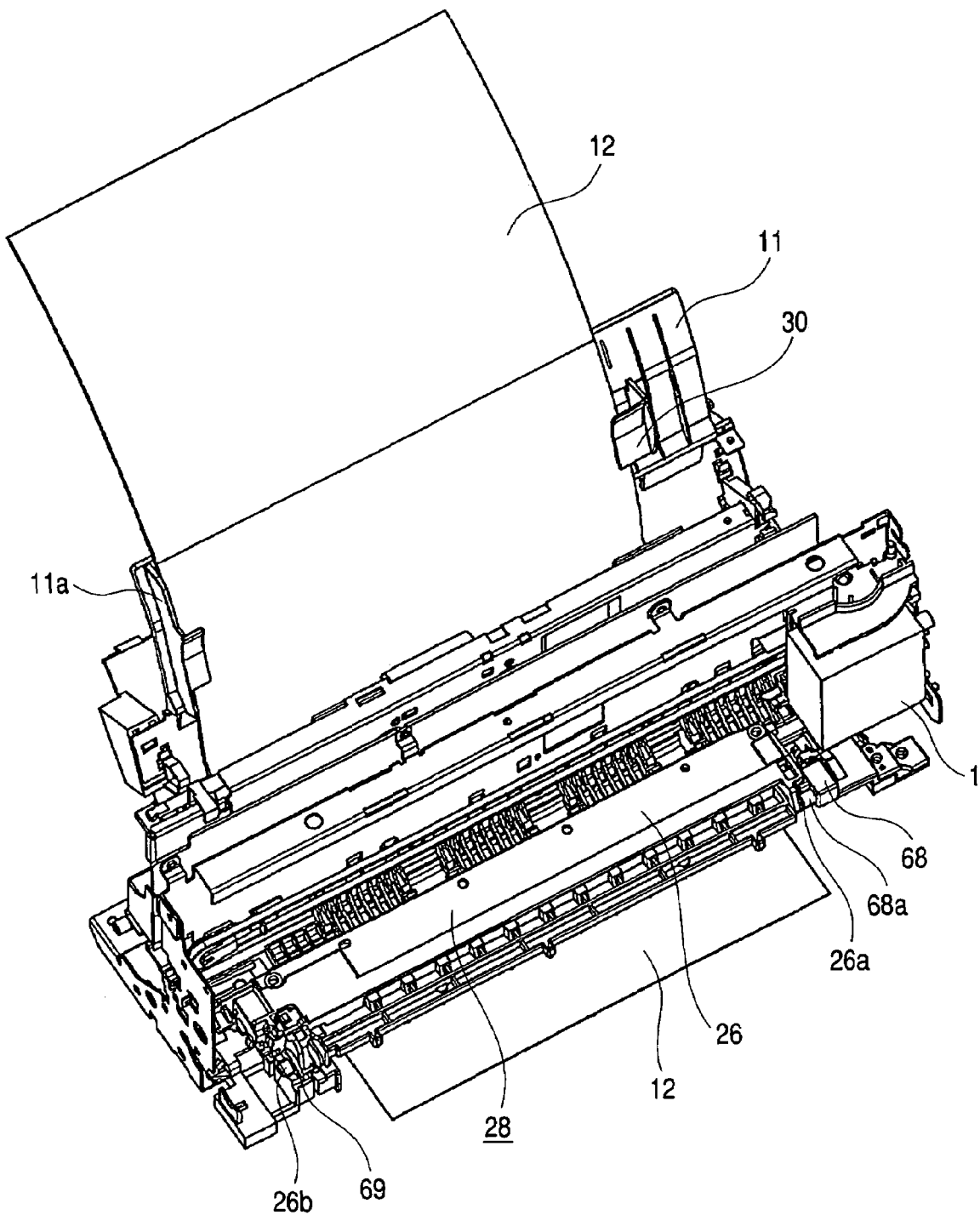
FIG. 14 is a perspective view showing the arrangement and construction of the reading portion and the recording portion in the facsimile apparatus of FIG. 1 during document reading.
Figure 15:
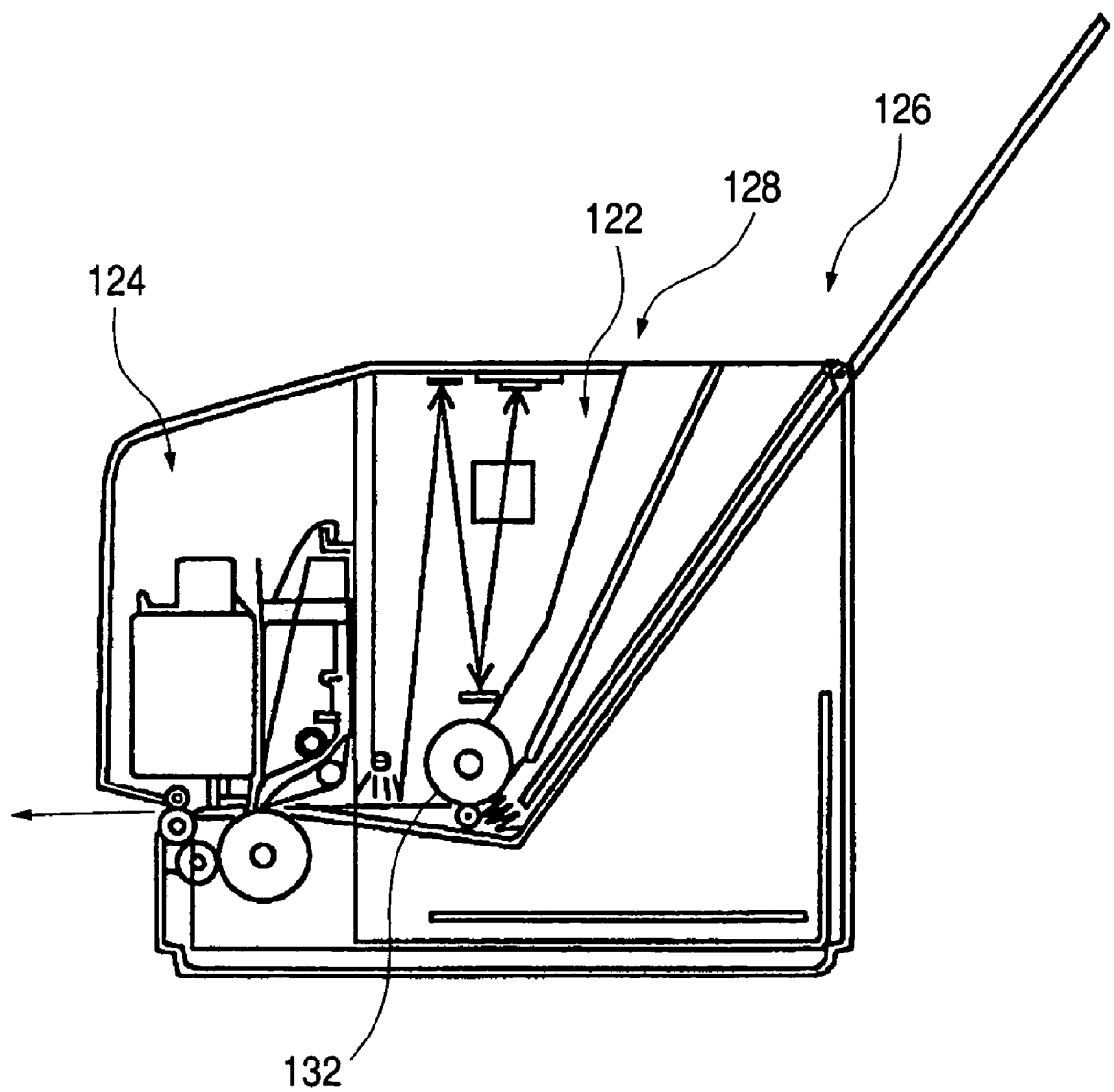
FIG. 15 schematically shows the construction of a conventional facsimile apparatus.

A boss 26a is formed on lengthwisely one side wall of the CS holder 26, and a boss 68b is formed on the other side wall of the CS holder 26, and as shown in FIG. 14, a hollow boss 68a formed on a CS holder supporting member 68 mounted on the platen 3 is engaged with the boss 26a on this one side wall, and a bearing portion 69 formed on the platen 3 is engaged with the boss 68b formed on the other side wall.

These right and left engaged portions are on the same shaft, whereby when during image recording shown in FIG. 7, the carriage 4 is moved in the scanning direction, the CS holder 26 can be moved from a first position (standby position) in which it does not contact with the carriage 4) to a second position (reading position) in the movement space of the carriage 4 shown in FIG. 1 in which a document reading transport path formed by the gap between the reading surface of the CS 22 and the white reference member 25 and a recording paper supporting surface formed by the platen 3 become flush with each other.

Further, when viewed from the delivery direction, the position of the CS holder 26 in the left to right direction is designed such that with the ink cartridge 1 being in a capping position (see FIG. 8) at one end (right end) of the movement range of the carriage, the CS holder 26 can be moved to the second position.

Also, the upstream side of the metal plate of the white reference member 25 with respect to the transport direction of the document is of a comb-tooth shape, and the ribs 38 of the platen are adapted to intervene among the comb teeth, and on the downstream side of the metal plate of the white reference member 25 with respect to the transport direction of the document, there is formed a bent portion for increasing the strength in the lengthwise direction.

Design is made such that when the CS holder 26 is to be moved to the second position, the bent portion depresses the auxiliary platen member 3a pivotally supported as already described, whereby the CS holder 26 can be moved to the second position. Thereby, during the reading of the document, the reading transport path formed between the transporting roller 10 and the delivery roller 17 by the white reference member 25 and the CS 22 and the recording paper supporting surface formed by the platen 3 become flush with each other.

Here, design is made such that when the CS holder 26 is moved to the second position, projections 401 and 402 provided on the CS holder 26 as shown in FIG. 9 come into engagement with positioning portions 411 and 412, respectively, provided on the upper surface of the platen 3, whereby the CS holder 26 is held in the second position.

Also, on one end portion (the widthwisely left end portion) of the CS holder 26, there is disposed CS driving means connected to a drive motor through drive changeover means and CS drive transmitting means (not shown) so that the CS holder 26 can be moved to the first position or the second position by the driving of the drive motor through the CS driving means.

Description will now be made of the image reading operation of the image reading apparatus portion 102 constructed as described above.

When the reading operation is started with the documents 12 set on the document tray 11, the drive changeover means is changed over by control means (not shown) to thereby transmit the drive of the drive motor to the document separating roller 15 and the document feeding roller 51 through reading drive transmitting means. Thereby, the document separating roller 15 and the document feeding roller 51 are rotated in the direction indicated by the arrow as shown in FIG. 2, and the documents 12 set on the document tray 11 are separated and fed out one by one by the document feeding roller 51 and the document separating roller 15 thus rotated and the separating piece 13.

At this time, the phase in the direction of rotation of the recording paper separating roller 19 disposed downstream of the document separating roller 15 with respect to the feeding direction thereof as already described is in an initial state, and a gap G sufficient for passing a document therethrough is formed between the cut-away portions 19b of the roller portions 19a of the recording paper separating roller 19 and the document lower guide member 23 (see FIG. 2).

Also, the document separating roller 15 is rotated as described above and also, the CS driving means is operated through the CS drive transmitting means, and the CS holder 26 biased in a counter-clockwise direction by a torsion coil spring (resilient member) (not shown) in the standby state of the apparatus, and held in the first position (standby position) as shown in FIG. 7 is pivotally moved in the direction indicated by the arrow.

In the present embodiment, setting is done such that by the gear ratio between the reading drive transmitting means and the CS drive transmitting means and the roller diameter being adjusted, the CS holder is moved to the second position before the document 12 arrives at the transporting roller 10.

When the CS holder 26 is thus moved to the second position, a clutch connecting the CS driving means and the CS drive transmitting means together is disconnected and the CS holder 26 is stopped and is biased in that position by a second coil spring (resilient member) (not shown). Also, at the same time, the CS holder 26 depresses the auxiliary platen member 3a, whereby a reading transport path flush with the recording paper supporting surface formed by the platen 3 is formed between the transporting roller 10 and the delivery roller 17.

Next, the document 12 separated and fed out, like the recording paper 2, is guided by the platen 3, the pinch roller guide 36 and the upper guide 42 while the underside thereof is supported by the document lower guide member 23, and is transported to the nip between the transporting roller 10 and the pinch rollers 16 while depressing the PES lever 21.

When the PES lever 21 is thus depressed, a detection signal is inputted from the PES 21S to control means (not shown), which in turn detects the leading edge of the document 12 on the basis of the detection signal so as to find the reading position on the document 12.

Next, the document 12 transported to the transporting roller 10 and the pinch rollers 16 is nipped by the transporting roller 10 and the four pinch rollers 16 and passes along the reading transport path formed by the CS 22 and the white reference member 25, and during this passage, image data thereon is read by the CS 22. When the most trailing edge of the document 12 is read, the document 12 is delivered out of the apparatus by the delivery roller 17.

When the document 12 is thus delivered, the drive motor 20 is rotated in a reverse direction, whereby the CS driving means and the CS drive transmitting means are connected together by the clutch, and the CS holder 26 is moved to the first position by the already described torsion coil spring.

Also, with the movement of the CS holder 26 to the first position, the auxiliary platen member 3a is pushed upwardly by the biasing force of the spring 58, whereby the flush (coplanar) recording paper supporting surface is formed by the recording paper supporting surface of the auxiliary platen member 3a and the recording paper supporting surface of the platen 3. Lastly, the drive of the drive motor is changed over to a recording mode by the drive changeover means, and the apparatus assumes a standby state.

As described above, the auxiliary platen member 3a constituting a supporting portion for supporting the recording paper 2 is retractably provided in the common transporting path 49, and design is made such that when the image of the document is to be read, a document transporting path is formed on the common transporting path 49 while the auxiliary platen member 3a is retracted from the common transporting path 49, and the CS holder 26 (the CS 22 held thereby) is moved to a position in which the reading of the image of the document is possible, whereby the downsizing and recording and reading accuracy of the apparatus can be maintained, and yet the contamination of the image reading portion 28 by the ink can be prevented.

As already described, the separated recording paper 2 and document 12 are transported by the common transporting roller 10 and delivery roller 17, whereby there is not the necessity of discretely providing a drive motor for reading and a document transporting mechanism, and a reduction in costs can be realized and the downsizing of the entire apparatus can be achieved.

Further, even when an image recording portion 1A of a construction using an ink jet recording method advantageous in such points as downsizing and running cost is adopted, as in the present embodiment, during the image recording operation, the CS 22 is retracted from the common transporting path 49, whereby the contamination by the ink mist and ink leakage during the recording operation can be prevented, and also limitations in layout become decreased and the degree of freedom during designing can be increased.

Also, during the image recording operation, the CS 22 is retracted from the common transporting path 49, whereby even if the jam or the like of the recording paper occurs in the image recording portion 1A, it is possible to prevent the occurrence of the trouble of unfixed ink adhering to the reading surface of the CS 22 or the white reference member 25. Also, design is made such that the reading surface of the CS 22 is covered with the white reference member 25, whereby the contamination of the reading surface of the CS 22 by ink mist can be greatly mitigated.

Also, as in the present embodiment, when the document 12 is to be fed, the recording paper separating roller 19 is stopped in a position in which the cut-away portions 19b face the document lower guide member 23 and do not come into between the document upper guide 14 and the document lower guide member 23, whereby for example, even when the document 12 is being fed, it becomes possible to suitably feed the recording paper 2.

Also, when the document 12 is to be fed, even if the document upper guide 14 provided above the document lower guide member 23 is pushed and upwardly pivotally moved by the document 12, this document upper guide 14 is made to abut against the shaft portion 19c of the recording paper separating roller 19 and is positioned so that the cut-away portions 19b of the recording paper separating roller 19 may not protrude into the document transporting path R2, whereby the document 12 can be fed reliably and stably without contacting with the recording paper separating roller 19.

Further, the document presser member 55 is provided in that portion of the recording paper separating roller 19 in which the document upper guide 14 cannot be disposed so that the document 12 passing between the document upper guide 14 and the document lower guide member 23 may be pressed by the document presser member 55 so as not to contact with the recording paper separating roller 19, whereby the document 12 can be fed reliably and stably.

With such a construction, it becomes unnecessary to read all documents before the recording paper 2 is fed and therefore, the number of memories for storing document data therein can be decreased. Also, design is made such that the document 12 and the recording paper 2 are fed out by the document separating roller 51 and the recording paper separating roller 19, respectively, and therefore the skew feeding of the document 12 or the recording paper 2 can be prevented.

While in the present embodiment, description has been made of a case where the document tray 11 is disposed above the recording paper tray 8 and in keeping therewith, the document separating roller 15 is provided upstream of the recording paper separating roller 19, the present invention is not restricted thereto, but the recording paper tray 8 may be disposed above the document tray 11 and in keeping therewith, the recording paper separating roller 19 may be provided upstream of the document separating roller 15. In such case, the recording paper 2 can be fed reliably and stably.

What is claimed is:

1. An image reading and recording apparatus provided with an image reading portion for reading an image of a document, and an image recording portion for recording an image on a recording sheet, said image reading and recording apparatus comprising:
   a first stacking portion for stacking thereon a first sheet which is one of the document and the recording sheet;
   first feeding means for feeding the first sheet stacked on said first stacking portion;
   a second stacking portion for stacking thereon a second sheet which is the other of the document and the recording sheet;
   second feeding means having a cut-away portion formed by cutting away a portion of a peripheral surface thereof and for feeding the second sheet stacked on said second stacking portion; and
   a lower guide member extending from said first stacking portion to said second feeding means for guiding the first sheet fed by said first feeding means,
   wherein when the first sheet is to be fed by said first feeding means, said second feeding means is stopped in a state in which said cut-away portion is opposed to said lower guide member so as to form between said cut-away portion and said lower guide member a gap through which the first sheet fed by said first feeding means passes, and
   wherein in a state in which the first sheet is stacked on said first stacking portion, the second sheet stacked on said second stacking portion is fed by said second feeding means.

2. An image reading and recording apparatus according to claim 1, wherein said second stacking portion supports the second sheet in its inclined state, and said first stacking portion is disposed in juxtaposed relationship with said second stacking portion, and supports the first sheet in its inclined state.

3. An image reading and recording apparatus according to claim 2, wherein said first feeding means and said second feeding means are disposed in a vertical direction along said second stacking portion.

4. An image reading and recording apparatus according to claim 1, wherein said second feeding means is disposed downstream of said first feeding means in a feeding direction of the first sheet fed out by said first feeding means.

5. An image reading and recording apparatus according to claim 1, further comprising a pressure plate provided on said second stacking portion for upward and downward movement, adapted to be upwardly moved to a first position in which feeding by said second feeding means is possible when it stacks the second sheet thereon and the second sheet is to be fed, and to be downwardly moved to a second position below said first position when feeding is not effected, wherein said second feeding means, when the second sheet is to be fed, feeds the second sheet stacked on said pressure plate moved to the second position with the peripheral surface thereof protruded from said lower guide member.

6. An image reading and recording apparatus according to claim 1, further comprising an upper guide member disposed above said lower guide member for guiding the first sheet fed by said first feeding means, wherein said upper guide member is designed to have its upper end portion pivotally held and to be pressed by the first sheet fed by said first feeding means and be upwardly pivotally moved.

7. An image reading and recording apparatus according to claim 6, wherein regulation of pivotal movement when said upper guide member is upwardly pivotally moved is effected by said second feeding means, and said upper guide member is regulated by a shaft portion of said second feeding means so as not to move to above the cut-away portion of said second feeding means when said cut-away portion is opposed to said lower guide member.

8. An image reading and recording apparatus according to claim 6, further comprising presser means for pressing the first sheet fed out by said first feeding means and passing between said upper guide member and said lower guide member, wherein a distal end portion of said presser means extends into a rotation radius of said second feeding means.

9. An image reading and recording apparatus according to claim 8, wherein said presser means is supported on an upstream side of said second feeding means, and is designed to abut against and be flexed by said second feeding means when said second feeding means is rotated to thereby feed the second sheet, and when said presser means is flexed, the distal end portion of said presser means is in a position in which the distal end portion does not contact with the second sheet.

10. An image reading and recording apparatus according to claim 1, wherein a surface of the cut-away portion of said second feeding means is of low friction.

11. An image reading and recording apparatus according to claim 10, wherein a low-friction member is provided on the surface of the cut-away portion of said second feeding means.

12. An image reading and recording apparatus according to any one of claims 1 to 9, further comprising:
   a document transporting path for transporting the document to said image reading portion;
   a sheet transporting path for transporting the recording sheet to said image recording portion; and
   a common transporting path forming a portion of said document transporting path and a portion of said sheet transporting path,
   wherein reading of the image of the document and image recording onto the recording sheet are effected in said common transporting path.

* * * * *

UNITED STATES PATENT AND TRADEMARK OFFICE
CERTIFICATE OF CORRECTION

PATENT NO. : 7,382,506 B2  
APPLICATION NO. : 10/728825  
DATED : June 3, 2008  
INVENTOR(S) : Takashi Awai et al.

Page 1 of 1

It is certified that error appears in the above-identified patent and that said Letters Patent is hereby corrected as shown below:

COLUMN 1:
Line 67, "pick" should read -- picking --.

COLUMN 13:
Line 45, "on lengthwisely" should read -- lengthwise on --.

COLUMN 18:
Line 42, "claims 1 to 9," should read -- claims 1 to 11, --.

Signed and Sealed this

Eleventh Day of November, 2008

JON W. DUDAS  
*Director of the United States Patent and Trademark Office*